US009330575B2

(12) United States Patent
Peters et al.

(10) Patent No.: US 9,330,575 B2
(45) Date of Patent: May 3, 2016

(54) TABLET-BASED WELDING SIMULATOR

(71) Applicant: LINCOLN GLOBAL, INC., City of Industry, CA (US)

(72) Inventors: Carl Peters, Solon, OH (US); Deanna Postlethwaite, Chagrin Falls, OH (US); Matthew Wayne Wallace, South Windsor, CT (US)

(73) Assignee: Lincoln Global, Inc., City of Industry, CA (US)

( * ) Notice: Subject to any disclaimer, the term of this patent is extended or adjusted under 35 U.S.C. 154(b) by 36 days.

(21) Appl. No.: 13/804,115

(22) Filed: Mar. 14, 2013

(65) Prior Publication Data
US 2013/0196296 A1    Aug. 1, 2013

Related U.S. Application Data

(63) Continuation-in-part of application No. 12/504,870, filed on Jul. 17, 2009.

(60) Provisional application No. 61/090,794, filed on Aug. 21, 2008.

(51) Int. Cl.
*G09B 5/00* (2006.01)
*G09B 5/02* (2006.01)
*G09B 19/24* (2006.01)

(52) U.S. Cl.
CPC .. *G09B 5/02* (2013.01); *G09B 5/00* (2013.01); *G09B 19/24* (2013.01)

(58) Field of Classification Search
CPC ............. B43L 1/00; G09B 19/00; G09B 5/00
USPC .................................. 434/408, 234, 209, 260
See application file for complete search history.

(56) References Cited

U.S. PATENT DOCUMENTS 1,159,119 A    11/1915 Springer
D140,630 S      3/1945 Garibay
(Continued)

FOREIGN PATENT DOCUMENTS

CA    2698078    9/2011
CN    101209512 A    7/2008
(Continued)

OTHER PUBLICATIONS

Yao, et al., 'Development of a Robot System for Pipe Welding'. 2010 International Conference on Measuring Technology and Mechatronics Automation. Retrieved from the Internet: http://ieeexplore.ieee.org/stamp/stamp.jsp?tp=&arnumber=5460347&tag=1; pp. 1109-1112.*

(Continued)

*Primary Examiner* — Robert P Bullington
(74) *Attorney, Agent, or Firm* — Hahn Loeser & Parks LLP

(57) ABSTRACT

Embodiments of the present invention pertain to a computer program product and processor based computing system that provides processing means for executing coded instructions and input means for interacting with said processing means to create a virtual welding environment. The system establishes an objective to change a functional or operational state of a virtual article, and directs the end user to perform at least one virtual welding operation for changing its functional state. The system trains new users and inexperienced welders on the fundamental aspects of welding and other technical aspects.

4 Claims, 14 Drawing Sheets

(56) References Cited

U.S. PATENT DOCUMENTS

| | | |
|---|---|---|
| D142,377 S | 9/1945 | Dunn |
| D152,049 S | 12/1948 | Welch |
| 2,681,969 A | 6/1954 | Burke |
| D174,208 S | 3/1955 | Abidgaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters et al. |
| 3,555,239 A | 1/1971 | Kerth |
| 3,621,177 A | 11/1971 | McPherson et al. |
| 3,654,421 A | 4/1972 | Streetman et al. |
| 3,739,140 A | 6/1973 | Rotilio |
| 3,866,011 A | 2/1975 | Cole |
| 3,867,769 A | 2/1975 | Schow et al. |
| 3,904,845 A | 9/1975 | Minkiewicz |
| 3,988,913 A | 11/1976 | Metcalfe et al. |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,124,944 A | 11/1978 | Blair |
| 4,132,014 A | 1/1979 | Schow |
| 4,237,365 A | 12/1980 | Lambros et al. |
| 4,280,041 A | 7/1981 | Kiesslilng et al. |
| 4,280,137 A | 7/1981 | Ashida et al. |
| 4,314,125 A | 2/1982 | Nakamura |
| 4,359,622 A | 11/1982 | Dostoomian et al. |
| 4,375,026 A | 2/1983 | Kearney |
| 4,410,787 A | 10/1983 | Kremers et al. |
| 4,429,266 A | 1/1984 | Tradt |
| 4,452,589 A | 6/1984 | Denison |
| D275,292 S | 8/1984 | Bouman |
| D277,761 S | 2/1985 | Korovin et al. |
| D280,329 S | 8/1985 | Bouman |
| 4,611,111 A | 9/1986 | Baheti et al. |
| 4,616,326 A | 10/1986 | Meier et al. |
| 4,629,860 A | 12/1986 | Lindbom |
| 4,677,277 A | 6/1987 | Cook et al. |
| 4,680,014 A | 7/1987 | Paton et al. |
| 4,689,021 A | 8/1987 | Vasiliev et al. |
| 4,707,582 A | 11/1987 | Beyer |
| 4,716,273 A | 12/1987 | Paton et al. |
| D297,704 S | 9/1988 | Bulow |
| 4,867,685 A | 9/1989 | Brush et al. |
| 4,877,940 A | 10/1989 | Bangs et al. |
| 4,897,521 A | 1/1990 | Burr |
| 4,907,973 A | 3/1990 | Hon |
| 4,931,018 A | 6/1990 | Herbst et al. |
| 4,998,050 A | 3/1991 | Nishiyama et al. |
| 5,034,593 A | 7/1991 | Rice et al. |
| 5,061,841 A | 10/1991 | Richardson |
| 5,089,914 A | 2/1992 | Prescott |
| 5,192,845 A | 3/1993 | Kirmsse et al. |
| 5,206,472 A | 4/1993 | Myking et al. |
| 5,266,930 A | 11/1993 | Ichikawa et al. |
| 5,285,916 A | 2/1994 | Ross |
| 5,305,183 A | 4/1994 | Teynor |
| 5,320,538 A | 6/1994 | Baum |
| 5,337,611 A | 8/1994 | Fleming et al. |
| 5,360,156 A | 11/1994 | Ishizaka et al. |
| 5,360,960 A | 11/1994 | Shirk |
| 5,370,071 A | 12/1994 | Ackermann |
| D359,296 S | 6/1995 | Witherspoon |
| 5,424,634 A | 6/1995 | Goldfarb et al. |
| 5,436,638 A | 7/1995 | Bolas et al. |
| 5,464,957 A | 11/1995 | Kidwell et al. |
| D365,583 S | 12/1995 | Viken |
| 5,562,843 A | 10/1996 | Yasumoto |
| 5,670,071 A | 9/1997 | Ueyama et al. |
| 5,676,503 A | 10/1997 | Lang |
| 5,676,867 A | 10/1997 | Allen |
| 5,708,253 A | 1/1998 | Bloch et al. |
| 5,710,405 A | 1/1998 | Solomon et al. |
| 5,719,369 A | 2/1998 | White et al. |
| D392,534 S | 3/1998 | Degen et al. |
| 5,728,991 A | 3/1998 | Takada et al. |
| 5,751,258 A | 5/1998 | Fergason et al. |
| D395,269 S | 6/1998 | McCauley, Jr. |
| D396,238 S | 7/1998 | Schmitt |
| 5,781,258 A | 7/1998 | Dabral et al. |
| 5,823,785 A | 10/1998 | Matherne, Jr. |
| 5,835,077 A | 11/1998 | Dao et al. |
| 5,835,277 A | 11/1998 | Hegg |
| 5,845,053 A | 12/1998 | Watanabe et al. |
| 5,963,891 A | 10/1999 | Walker et al. |
| 6,008,470 A | 12/1999 | Zhang et al. |
| 6,049,059 A | 4/2000 | Kim |
| 6,051,805 A | 4/2000 | Vaidya et al. |
| 6,114,645 A | 9/2000 | Burgess |
| 6,155,475 A | 12/2000 | Ekelof et al. |
| 6,155,928 A | 12/2000 | Burdick |
| 6,230,327 B1 | 5/2001 | Briand |
| 6,236,013 B1 | 5/2001 | Delzenne |
| 6,236,017 B1 | 5/2001 | Smartt et al. |
| 6,242,711 B1 | 6/2001 | Cooper |
| 6,271,500 B1 | 8/2001 | Hirayama et al. |
| 6,330,938 B1 | 12/2001 | Herve et al. |
| 6,330,966 B1 | 12/2001 | Eissfeller |
| 6,331,848 B1 | 12/2001 | Stove et al. |
| D456,428 S | 4/2002 | Aronson et al. |
| 6,373,465 B2 | 4/2002 | Jolly et al. |
| D456,828 S | 5/2002 | Aronson et al. |
| D461,383 S | 8/2002 | Blackburn |
| 6,441,342 B1 | 8/2002 | Hsu |
| 6,445,964 B1 | 9/2002 | White et al. |
| 6,506,997 B2 | 1/2003 | Matsuyama |
| 6,552,303 B1 | 4/2003 | Blankenship et al. |
| 6,560,029 B1 | 5/2003 | Dobbie et al. |
| 6,563,489 B1 | 5/2003 | Latypov et al. |
| 6,568,846 B1 | 5/2003 | Cote et al. |
| D475,726 S | 6/2003 | Suga et al. |
| 6,572,379 B1 | 6/2003 | Sears et al. |
| 6,583,386 B1 | 6/2003 | Ivkovich |
| 6,621,049 B2 | 9/2003 | Suzuki |
| 6,624,388 B1 | 9/2003 | Blankenship et al. |
| D482,171 S | 11/2003 | Vui et al. |
| 6,647,288 B2 | 11/2003 | Madill et al. |
| 6,649,858 B2 | 11/2003 | Wakeman |
| 6,655,645 B1 | 12/2003 | Lu et al. |
| 6,660,965 B2 | 12/2003 | Simpson |
| 6,697,701 B2 | 2/2004 | Hillen et al. |
| 6,697,770 B1 | 2/2004 | Nagetgaal |
| 6,703,585 B2 | 3/2004 | Suzuki |
| 6,708,385 B1 | 3/2004 | Lemelson |
| 6,710,298 B2 | 3/2004 | Eriksson |
| 6,710,299 B2 | 3/2004 | Blankenship et al. |
| 6,715,502 B1 | 4/2004 | Rome et al. |
| D490,347 S | 5/2004 | Meyers |
| 6,730,875 B2 | 5/2004 | Hsu |
| 6,734,393 B1 | 5/2004 | Friedl et al. |
| 6,744,011 B1 | 6/2004 | Hu et al. |
| 6,750,428 B2 | 6/2004 | Okamoto et al. |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,857,553 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,920,371 B2 | 7/2005 | Hillen et al. |
| 6,940,039 B2 | 9/2005 | Blankenship et al. |
| 7,021,937 B2 | 4/2006 | Simpson et al. |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey et al. |
| 7,247,814 B2 | 7/2007 | Ott |
| D555,446 S | 11/2007 | Picaza Ibarrondo |
| D561,973 S | 2/2008 | Kinsley et al. |
| 7,353,715 B2 | 4/2008 | Myers |
| 7,363,137 B2 | 4/2008 | Brant et al. |

(56) References Cited

U.S. PATENT DOCUMENTS

| | | |
|---|---|---|
| 7,375,304 B2 | 5/2008 | Kainec et al. |
| 7,381,923 B2 | 6/2008 | Gordon et al. |
| 7,414,595 B1 | 8/2008 | Muffler |
| 7,465,230 B2 | 12/2008 | LeMay et al. |
| 7,478,108 B2 | 1/2009 | Townsend et al. |
| D587,975 S | 3/2009 | Aronson et al. |
| 7,516,022 B2 | 4/2009 | Lee et al. |
| D602,057 S | 10/2009 | Osicki |
| 7,621,171 B2 | 11/2009 | O'Brien |
| D606,102 S | 12/2009 | Bender et al. |
| 7,643,890 B1 | 1/2010 | Hillen et al. |
| 7,687,741 B2 | 3/2010 | Kainec et al. |
| D614,217 S | 4/2010 | Peters et al. |
| D615,573 S | 5/2010 | Peters et al. |
| 7,817,162 B2 | 10/2010 | Bolick et al. |
| 7,853,645 B2 | 12/2010 | Brown et al. |
| D631,074 S | 1/2011 | Peters et al. |
| 7,874,921 B2 | 1/2011 | Baszucki et al. |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear et al. |
| 8,248,324 B2 | 8/2012 | Nangle |
| 8,265,886 B2 | 9/2012 | Bisiaux et al. |
| 8,274,013 B2 | 9/2012 | Wallace |
| 8,287,522 B2 | 10/2012 | Moses et al. |
| 8,316,462 B2 | 11/2012 | Becker et al. |
| 8,363,048 B2 | 1/2013 | Gering |
| 8,365,603 B2 | 2/2013 | Lesage et al. |
| 8,512,043 B2 | 8/2013 | Choquet |
| 8,569,646 B2 | 10/2013 | Daniel et al. |
| 8,777,629 B2 | 7/2014 | Kreindl et al. |
| 2001/0045808 A1 | 11/2001 | Hietmann et al. |
| 2001/0052893 A1 | 12/2001 | Jolly et al. |
| 2002/0032553 A1 | 3/2002 | Simpson et al. |
| 2002/0046999 A1 | 4/2002 | Veikkolainen et al. |
| 2002/0050984 A1 | 5/2002 | Roberts |
| 2002/0085843 A1 | 7/2002 | Mann |
| 2002/0175897 A1 | 11/2002 | Pelosi |
| 2003/0000931 A1 | 1/2003 | Ueda et al. |
| 2003/0023592 A1 | 1/2003 | Modica et al. |
| 2003/0025884 A1 | 2/2003 | Hamana et al. |
| 2003/0106787 A1 | 6/2003 | Santilli |
| 2003/0111451 A1 | 6/2003 | Blankenship et al. |
| 2003/0172032 A1 | 9/2003 | Choquet |
| 2003/0234885 A1 | 12/2003 | Pilu |
| 2004/0020907 A1 | 2/2004 | Zauner et al. |
| 2004/0035990 A1 | 2/2004 | Ackeret |
| 2004/0050824 A1 | 3/2004 | Samler |
| 2004/0140301 A1 | 7/2004 | Blankenship et al. |
| 2005/0007504 A1 | 1/2005 | Fergason |
| 2005/0017152 A1 | 1/2005 | Fergason |
| 2005/0046584 A1 | 3/2005 | Breed |
| 2005/0050168 A1 | 3/2005 | Wen et al. |
| 2005/0101767 A1 | 5/2005 | Clapham et al. |
| 2005/0103766 A1 | 5/2005 | Iizuka et al. |
| 2005/0103767 A1 | 5/2005 | Kainec et al. |
| 2005/0109735 A1 | 5/2005 | Flood |
| 2005/0128186 A1 | 6/2005 | Shahoian et al. |
| 2005/0133488 A1 | 6/2005 | Blankenship |
| 2005/0159840 A1 | 7/2005 | Lin et al. |
| 2005/0189336 A1 | 9/2005 | Ku |
| 2005/0199602 A1 | 9/2005 | Kaddani et al. |
| 2005/0230573 A1 | 10/2005 | Ligertwood |
| 2005/0252897 A1 | 11/2005 | Hsu |
| 2005/0275913 A1 | 12/2005 | Vesely et al. |
| 2005/0275914 A1 | 12/2005 | Vesely et al. |
| 2006/0014130 A1 | 1/2006 | Weinstein |
| 2006/0136183 A1 | 6/2006 | Choquet |
| 2006/0163227 A1 | 7/2006 | Hillen et al. |
| 2006/0169682 A1 | 8/2006 | Kainec et al. |
| 2006/0173619 A1 | 8/2006 | Brant et al. |
| 2006/0189260 A1 | 8/2006 | Sung |
| 2006/0207980 A1 | 9/2006 | Jacovetty et al. |
| 2006/0213892 A1 | 9/2006 | Ott |
| 2006/0214924 A1 | 9/2006 | Kawamoto et al. |
| 2006/0226137 A1 | 10/2006 | Huismann et al. |
| 2006/0252543 A1 | 11/2006 | Van Noland et al. |
| 2006/0258447 A1 | 11/2006 | Baszucki et al. |
| 2007/0034611 A1 | 2/2007 | Drius et al. |
| 2007/0038400 A1 | 2/2007 | Lee et al. |
| 2007/0045488 A1 | 3/2007 | Shin |
| 2007/0088536 A1 | 4/2007 | Ishikawa |
| 2007/0112889 A1 | 5/2007 | Cook et al. |
| 2007/0198117 A1 | 8/2007 | Wajihuddin |
| 2007/0211026 A1 | 9/2007 | Ohta |
| 2007/0221797 A1 | 9/2007 | Thompson et al. |
| 2007/0256503 A1 | 11/2007 | Wong et al. |
| 2007/0277611 A1 | 12/2007 | Portzgen et al. |
| 2007/0291035 A1 | 12/2007 | Vesely et al. |
| 2008/0031774 A1 | 2/2008 | Magnant et al. |
| 2008/0038702 A1 | 2/2008 | Choquet |
| 2008/0078811 A1 | 4/2008 | Hillen et al. |
| 2008/0078812 A1 | 4/2008 | Peters et al. |
| 2008/0117203 A1 | 5/2008 | Gering |
| 2008/0128398 A1 | 6/2008 | Schneider |
| 2008/0135533 A1 | 6/2008 | Ertmer et al. |
| 2008/0140815 A1 | 6/2008 | Brant et al. |
| 2008/0149686 A1 | 6/2008 | Daniel et al. |
| 2008/0203075 A1 | 8/2008 | Feldhausen et al. |
| 2008/0233550 A1 | 9/2008 | Solomon |
| 2008/0314887 A1 | 12/2008 | Stoger et al. |
| 2009/0015585 A1 | 1/2009 | Klusza |
| 2009/0021514 A1 | 1/2009 | Klusza |
| 2009/0045183 A1 | 2/2009 | Artelsmair et al. |
| 2009/0057286 A1 | 3/2009 | Ihara et al. |
| 2009/0152251 A1 | 6/2009 | Dantinne et al. |
| 2009/0173726 A1 | 7/2009 | Davidson et al. |
| 2009/0184098 A1 | 7/2009 | Daniel et al. |
| 2009/0200281 A1 | 8/2009 | Hampton |
| 2009/0200282 A1 | 8/2009 | Hampton |
| 2009/0231423 A1 | 9/2009 | Becker et al. |
| 2009/0259444 A1 | 10/2009 | Dolansky et al. |
| 2009/0298024 A1 | 12/2009 | Batzler et al. |
| 2009/0325699 A1 | 12/2009 | Delgiannidis |
| 2010/0012017 A1 | 1/2010 | Miller |
| 2010/0012637 A1 | 1/2010 | Jaeger |
| 2010/0048273 A1* | 2/2010 | Wallace et al. ............ 463/7 |
| 2010/0062405 A1 | 3/2010 | Zboray et al. |
| 2010/0062406 A1 | 3/2010 | Zboray et al. |
| 2010/0096373 A1 | 4/2010 | Hillen et al. |
| 2010/0121472 A1 | 5/2010 | Babu et al. |
| 2010/0133247 A1 | 6/2010 | Mazumder et al. |
| 2010/0133250 A1 | 6/2010 | Sardy et al. |
| 2010/0176107 A1 | 7/2010 | Bong |
| 2010/0201803 A1 | 8/2010 | Melikian |
| 2010/0224610 A1 | 9/2010 | Wallace |
| 2010/0276396 A1 | 11/2010 | Cooper et al. |
| 2010/0299101 A1 | 11/2010 | Shimada et al. |
| 2010/0307249 A1 | 12/2010 | Lesage et al. |
| 2011/0006047 A1 | 1/2011 | Penrod et al. |
| 2011/0060568 A1 | 3/2011 | Goldfine et al. |
| 2011/0091846 A1* | 4/2011 | Kreindl et al. ............ 434/234 |
| 2011/0114615 A1 | 5/2011 | Daniel et al. |
| 2011/0116076 A1 | 5/2011 | Chantry et al. |
| 2011/0117527 A1 | 5/2011 | Conrardy et al. |
| 2011/0122495 A1 | 5/2011 | Togashi |
| 2011/0183304 A1 | 7/2011 | Wallace et al. |
| 2011/0248864 A1 | 10/2011 | Becker et al. |
| 2011/0316516 A1 | 12/2011 | Schiefermuller et al. |
| 2012/0189993 A1 | 7/2012 | Kindig et al. |
| 2012/0291172 A1 | 11/2012 | Wills et al. |
| 2013/0026150 A1 | 1/2013 | Chantry et al. |
| 2013/0040270 A1* | 2/2013 | Albrecht ............ 434/234 |
| 2013/0075380 A1* | 3/2013 | Albrech et al. ............ 219/137 R |
| 2013/0189657 A1 | 7/2013 | Wallace et al. |
| 2013/0189658 A1 | 7/2013 | Peters et al. |
| 2014/0134580 A1* | 5/2014 | Becker ............ 434/234 |
| 2014/0263224 A1 | 9/2014 | Becker |

(56) References Cited

U.S. PATENT DOCUMENTS

| | | |
|---|---|---|
| 2014/0272836 A1 | 9/2014 | Becker |
| 2014/0272837 A1 | 9/2014 | Becker |
| 2014/0272838 A1 | 9/2014 | Becker |

FOREIGN PATENT DOCUMENTS

| | | | |
|---|---|---|---|
| CN | 101214178 A | | 7/2008 |
| CN | 201083660 Y | | 7/2008 |
| CN | 101419755 A1 | | 4/2009 |
| CN | 201229711 Y | | 4/2009 |
| CN | 101571887 A | | 11/2009 |
| CN | 101587659 A | | 11/2009 |
| CN | 103871279 A | | 6/2014 |
| DE | 28 33 638 A1 | | 2/1980 |
| DE | 30 46 634 A1 | | 1/1984 |
| DE | 32 44 307 A1 | | 5/1984 |
| DE | 35 22 581 A1 | | 1/1987 |
| DE | 4037879 A1 | | 6/1991 |
| DE | 196 15 069 A1 | | 10/1997 |
| DE | 197 39 720 C1 | | 10/1998 |
| DE | 19834205 A1 | | 2/2000 |
| DE | 200 09 543 U1 | | 8/2001 |
| DE | 10 2005 047 204 A1 | | 4/2007 |
| DE | 10 2010 038 902 A1 | | 2/2012 |
| EP | 0 108 599 A1 | | 5/1984 |
| EP | 0 127 299 | | 12/1984 |
| EP | 0 145 891 A1 | | 6/1985 |
| EP | 319623 B1 | | 10/1990 |
| EP | 0852986 A1 | | 7/1998 |
| EP | 1 527 852 A1 | | 5/2005 |
| EP | 1905533 A2 | | 4/2008 |
| ES | 2 274 736 A1 | | 5/2007 |
| ES | 2274736 A1 | | 5/2007 |
| FR | 1456780 | | 3/1965 |
| FR | 2 827 066 A1 | | 1/2003 |
| FR | 2 926 660 A1 | | 7/2009 |
| GB | 1 455 972 | | 11/1976 |
| GB | 1 511 608 | | 5/1978 |
| GB | 2 254 172 A | | 9/1992 |
| GB | 2435838 A | | 9/2007 |
| GB | 2 454 232 A | | 5/2009 |
| JP | 2-224877 | | 9/1990 |
| JP | 05-329645 | | 12/1993 |
| JP | 07-047471 | | 2/1995 |
| JP | 07-232270 | | 9/1995 |
| JP | 08-505091 | | 4/1996 |
| JP | 08-150476 | | 6/1996 |
| JP | 08-132274 | | 5/1998 |
| JP | 2000-167666 A | | 6/2000 |
| JP | 2001-071140 A | | 3/2001 |
| JP | 2003-200372 A | | 7/2003 |
| JP | 2003-326362 A | | 11/2003 |
| JP | 2006-006604 A | | 1/2006 |
| JP | 2006-281270 A | | 10/2006 |
| JP | 2007-290025 A | | 11/2007 |
| JP | 2009-500178 A | | 1/2009 |
| JP | 2009160636 A | | 7/2009 |
| KR | 20090010693 | | 1/2009 |
| RU | 2008 108 601 C1 | | 11/2009 |
| SU | 1038963 A1 | | 8/1983 |
| WO | 98/45078 | | 10/1998 |
| WO | 0112376 A1 | | 2/2001 |
| WO | 01/43910 | | 6/2001 |
| WO | 0158400 A1 | | 8/2001 |
| WO | 2005102230 A1 | | 11/2005 |
| WO | 2006034571 A1 | | 4/2006 |
| WO | 2009120921 | | 1/2009 |
| WO | 2009060231 A1 | | 5/2009 |
| WO | 2009149740 A1 | | 12/2009 |
| WO | 2010000003 A2 | | 1/2010 |
| WO | 2010044982 | | 4/2010 |
| WO | 2010091493 A1 | | 8/2010 |
| WO | 2011058433 | | 5/2011 |
| WO | 2011067447 A1 | | 6/2011 |
| WO | 2011097035 A2 | | 8/2011 |
| WO | 2012143327 A1 | | 10/2012 |
| WO | 2013014202 A1 | | 1/2013 |
| WO | 2013114189 A1 | | 8/2013 |
| WO | 2013175079 A1 | | 11/2013 |
| WO | 2014019045 A1 | | 2/2014 |
| WO | 2014020386 | | 2/2014 |

OTHER PUBLICATIONS

Chuansong Wu: "Microcomputer-based welder training simulator", Computers in Industry, vol. 20, No. 3, Oct. 1992, pp. 321-325, XP000205597, Elsevier Science Publishers, Amsterdam, NL.

Vizitech USA, ViziTech USA webpage, retrieved on Mar. 27, 2014 from http://vizitechusa.com/, 2 pages.

Guu and Rokhlin ,Technique for Simultaneous Real-Time Measurements of Weld Pool Surface Geometry and Arc Force, 10 pages, Dec. 1992.

D. Mavrikios, V. Karabatsou, D. Fragos and G. Chryssolouris, A prototype virtual reality-based demonstrator for immersive and interactive simulation of welding processes, International Journal of Computer Integrated Manufacturing, abstract, 1 page, Apr.-May 2006, 294-300, vol. 19, No. 3, http://eds.a.ebscohost.com/eds/pdfviewer/pdfviewer?vid=2&sid=ab8fe67b-1 f7.

S.B. Chen, L. Wu, Q. L. Wang and Y. C. Liu, Self-Learning Fuzzy Neural Networks and Computer Vision for Control of Pulsed GTAW, 9 pages, dated May 1997.

Patrick Rodjito, Position tracking and motion prediction using Fuzzy Logic, 81 pages, 2006, Colby College.

D'Huart, Deat, and Lium; Virtual Environment for Training, 6th International Conference, ITS 20002, 6 pages, Jun. 2002.

Konstantinos Nasios (Bsc), Improving Chemical Plant Safety Training Using Virtual Reality, Thesis submitted to the University of Nottingham for the Degree of Doctor of Philosophy, 313 pages, Dec. 2001.

Nancy C. Porter, J. Allan Cote, Timothy D. Gifford, and Wim Lam, Virtual Reality Welder Training, 29 pages, dated Jul. 14, 2006.

J.Y. (Yosh) Mantinband, Hillel Goldenberg, Llan Kleinberger, Paul Kleinberger, Autosteroscopic, field-sequential display with full freedom of movement or Let the display were the shutter-glasses, 3ality (Israel) Ltd., 2002.

SIMFOR / CESOL, "RV-SOLD" Welding Simulator, Technical and Functional Features, 20 pages, no date available.

International Search Report for PCT/IB2009/00605.

"Design and Implementation of a Video Sensor for Closed Loop Control of Back Bead Weld Puddle Width," Robert Schoder, Massachusetts, Institute of Technology, Dept. of Mechanical Engineering, May 27, 1983.

Hills and Steele, Jr.; "Data Parallel Algorithms", Communications of the ACM, Dec. 1986, vol. 29, No. 12, p. 1170.

Russell and Norvig, "Artificial Intelligence: A Modern Approach", Prentice-Hall (Copywrite 1995).

Mechanisms and Mechanical Devices Source Book, Chironis, Neil Sclater; McGraw Hill; 2nd Addition, 1996.

ARS Electronica LINZ GMBH, Fronius, 2 pages, May 18, 1997.

"Penetration in Spot GTA Welds during Centrifugation, "D.K. Aidun and S.A. Martin; Journal of Material Engineering and Performance Volumn 7(5) Oct. 1998—597.

Arc+ simulator; httl://www.123arc.com/en/depliant_ang.pdf; 2000.

Wade, "Human uses of ultrasound: ancient and modern", Ulrasonics vol. 38, dated 2000.

ASME Definitions, Consumables, Welding Positions, dated Mar. 19, 2001. See http://www.gowelding.com/asme4.htm.

Code Aster (Software) EDF (France), Oct. 2001.

"The influence of fluid flow phenomena on the laser beam welding process"; International Journal of Heat and Fluid Flow 23, dated 2002.

The Lindoln Electric Company; CheckPoint Production Monitoring brochure; four (4) pages; http://www.lincolnelectric.com/assets/en_US/products/literature/s232.pdf; Publication S2.32; Issue Date Feb. 2012.

(56) References Cited

OTHER PUBLICATIONS

"Numerical Analysis of Metal Transfer in Gas Metal Arc Welding," G. Wang, P.G. Huang, and Y.M. Zhang. Departments of Mechanical and Electrical Engineering. University of Kentucky, Dec. 10, 2001.
Desroches, X.; Code-Aster, Note of use for aclculations of welding; Instruction manual U2.03 booklet: Thermomechincal; Document: U2.03.05; Oct. 1, 2003.
Fast, K. et al., "Virtual Training for Welding", Mixed and Augmented Reality, 2004, ISMAR 2004, Third IEEE and SM International Symposium on Arlington, VA, Nov. 2-5, 2004.
Cooperative Research Program, Virtual Reality Welder Training, Summary Report SR 0512, 4 pages, Jul. 2005.
Porter, et al., Virtual Reality Training, Paper No. 2005-P19, 14 pages, 2005.
Eduwelding+, Weld Into the Future; Online Welding Seminar—A virtual training environment; 123arc.com; 4 pages, 2005.
Miller Electric MFG Co.; MIG Welding System features weld monitoring software; NewsRoom 2010 (Dialog® File 992); © 2011 Dialog. 2010; http://www.dialogweb.com/cgi/dwclient?reg=133233430487; three (3) pages; printed Mar. 8, 2012.
Numerical simulation to study the effect of tack welds and root gap on welding deformations and residual stresses of a pipe-flange joint by M. Abida and M. Siddique, Faculty of Mechanical Engineering, GIK Institute of Engineering Sciences and Technology, Topi, NWFP, Pakistan. Available on-line Aug. 25, 2005.
Abbas, M. et. al.; Code_Aster; Introduction to Code_Aster; User Manual; Booklet U1.0-: Introduction to Code_Aster; Document: U1.02.00; Version 7.4; Jul. 22, 2005.
Mavrikios D et al, A prototype virtual reality-based demonstrator for immersive and interactive simulation of welding processes, International Journal of Computer Integrated manufacturing, Taylor and Francis, Basingstoke, GB, vol. 19, No. 3, Apr. 1, 2006, pp. 294-300.
Virtual Reality Welder Trainer, Sessiion 5: Joining Technologies for Naval Applications: earliest date Jul. 14, 2006 (http://weayback.archive.org) by Nancy C. Porter, Edision Welding Institute; J. Allan Cote, General Dynamics Electric Boat; Timothy D. Gifford, VRSim, and Wim Lam, FCS Controls.
16th International Shop and Offshore Structures Congress: Aug. 20-25, 2006: Southhampton, UK, vol. 2 Specialist Committee V.3 Fabrication Technology Committee Mandate: T Borzecki, G. Bruce, Y.S. Han, M. Heinemann, A Imakita, L. Josefson, W. Nie, D. Olson, F. Roland, and Y. Takeda.
Ratnam and Khalid: "Automatic classification of weld defects using simulated data and an MLP neutral network." Insight vol. 49, No. 3; Mar. 2007.
Wang et al., Study on welder training by means of haptic guidance and virtual reality for arc welding, 2006 IEEE International Conference on Robotics and Biomimetics, ROBIO 2006 ISBN-10: 1424405718, p. 954-958.
CS Wave, The Virtual Welding Trainer, 6 pages, 2007.
Asciencetutor.com, A division of Advanced Science and Automation Corp., VWL (Virtual Welding Lab), 2 pages, 2007.
Eric Linholm, John Nickolls, Stuart Oberman, and John Montrym, "NVIDIA Testla: A Unifired Graphics and Computing Architecture", IEEE Computer Society, 2008.
NSRP ASE, Low-Cost Virtual Realtiy Welder Training System, 1 Page, 2008.
Edison Welding Institute, E-Weld Predictor, 3 pages, 2008.
CS Wave, A Virtual learning tool for welding motion, 10 pages, Mar. 14, 2008.
The Fabricator, Virtual Welding, 4 pages, Mar. 2008.
N. A. Tech., P/NA.3 Process Modeling and Optimization, 11 pages, Jun. 4, 2008.
FH Joanneum, Fronius—virtual welding, 2 pages, May 12, 2008.
Eduwelding+, Training Activities with arc+ simulator; Weld Into the Future, Online Welding Simulator—A virtual training environment; 123arc.com; 6 pages, May 2008.
ChemWeb.com, Journal of Materials Engineering and Performance (v.7, #5), 3 pgs., printed Sep. 26, 2012.

Choquet, Claude; "ARC+: Today's Virtual Reality Solution for Welders" Internet Page, Jan. 1, 2008.
Juan Vicenete Rosell Gonzales, "RV-Sold: simulator virtual para la formacion de soldadores"; Deformacion Metalica, Es. vol. 34, No. 301 Jan. 1, 2008.
White et al., Virtual welder training, 2009 IEEE Virtual Reality Conference, p. 303, 2009.
Training in a virtual environment gives welding students a leg up, retrieved on Apr. 12, 2010 from: http://www.thefabricator.com/article/arcwelding/virtually-welding.
Sim Welder, retrieved on Apr. 12, 2010 from: http://www.simwelder.com.
P. Beatriz Garcia-Allende, Jesus Mirapeix, Olga M. Conde, Adolfo Cobo and Jose M. Lopez-Higuera; Defect Detection in Arc-Welding Processes by Means of the Line-to-Continuum Method and Feature Selection; www.mdpi.corn/journal/sensors; Sensors 2009, 9, 7753-7770; doi; 10.3390/s91007753.
Production Monitoring 2 brochure, four (4) pages, The Lincoln Electric Company, May 2009.
International Search Report and Written Opinion from PCT/IB10/02913 dated Apr. 19, 2011.
Bjorn G. Agren; Sensor Integration for Robotic Arc Welding; 1995; vol. 5604C of Dissertations Abstracts International p. 1123; Dissertation Abs Online (Dialog® File 35): © 2012 ProQuest Info& Learning: http://dialogweb.com/cgi/dwclient?req=1331233317524; one (1) page; printed Mar. 8, 2012.
Heat and mass transfer in gas metal arc welding. Part 1: the arc by J. Hu and Hi Tsai found in ScienceDirect, International Journal of Heat and Mass Transfer 50 (2007) 833-846 Available on Line on Oct. 24, 2006 http://www.web.mst.edu/~tsai/publications/HU-IJHMT-2007-1-60.pdf.
Texture Mapping by M. Ian Graham, Carnegie Mellon University Class 15-462 Computer Graphics, Lecture 10 dated Feb. 13, 2003.
Steve Mann, Raymond Chun Bing Lo, Kalin Ovtcharov, Shixiang Gu, David Dai, Calvin Ngan, Tao Ai, Realtime HDR (High Dynamic Range) Video for Eyetap Wearable Computers, FPGA-Based Seeing Aids, and Glasseyes (Eyetaps), 2012 25th IEEE Canadian Conference on Electrical and Computer Engineering (CCECE),pp. 1-6, 6 pages, Apr. 29, 2012.
Kyt Dotson, Augmented Reality Welding Helmet Prototypes How Awsome the Technology Can Get, Sep. 26, 2012, Retrieved from the Internet: URL:http://siliconangle.com/blog/2012/09/26/augmented-reality-welding-helmet-prototypes-how-awesome-the-technology-can-get/,1 page, retrieved on Sep. 26, 2014.
Terrence O'Brien, "Google's Project Glass gets some more details", (Jun. 27, 2012), Retrieved from the Internet: http://www.engadget.com/2012/06/27/googles-project-glass-gets-some-more-details/, 1 page, retrieved on Sep. 26, 2014.
Yao, et al., 'Development of a Robot System for Pipe Welding'. 2010 International Conference on Measuring echnology and Mechatronics Automation. Retrieved from the Internet: http://ieeexplore.ieee.org/stamp/stamp.jsp?tp=&arnumber=5460347&tag=1; pp. 1109-1112, 4 pages, 2010.
ANANSI/A WS D 10.11 MID 10. 11 :2007 Guide for Root Pass Welding of Pipe without Backing Edition: 3rd American Welding Society / Oct. 13, 2006/36 pages ISBN: 0871716445, 6 pages.
M. Jonsson, L. Karlsson, and L-E Lindgren, Simulation of Tack Welding Procedures in Butt Joint Welding of Plates Welding Research Supplement, 7 pages, Oct. 1985.
Isaac Brana Veiga, Simulation of a Work Cell in the IGRIP Program, 50 pages, dated 2006.
Balijepalli, A. and Kesavadas, Haptic Interfaces for Virtual Environment and Teleoperator Systems, Haptics 2003, 7-.,Department of Mechanical & Aerospace Engineering, State University of New York at Buffalo, NY, 7 pages, 2003.
Johannes Hirche, Alexander Ehlert, Stefan Guthe, Michael Doggett, Hardware Accelerated Per-Pixel Displacement Mapping, 8 pages.
William T. Reeves, "Particles Systems—A Technique for Modeling a Class of Fuzzy Objects", Computer Graphics 17:3 pp. 359-376, 17 pages, 1983.

(56) References Cited

OTHER PUBLICATIONS

T. Borzecki, G. Bruce, YS. Han, et al., Specialist Committee V.3 Fabrication Technology Committee Mandate, Aug. 20-25, 2006, 49 pages, vol. 2, 16th International Ship and Offshore Structures Congress, Southampton, UK.

G. Wang, P.G. Huang, and Y.M. Zhang: "Numerical Analysis of Metal Transfer in Gas Metal Arc Welding": Departments of Mechanical Engineering; and Electrical and Computer Engineering, University of Kentucky, Lexington, KY 40506-0108, Dec. 10, 2001, 10 pages.

Echtler et al, "17 The Intelligent Welding Gun: Augmented Reality for Experimental Vehicle Construction," Virtual and Augmented Reality Applications in Manufacturing (2003) pp. 1-27.

Teeravarunyou et al, "Computer Based Welding Training System," International Journal of Industrial Engineering (2009) 16(2): 116-125.

Antonelli et al, "A Semi-Automated Welding Station Exploiting Human-Robot Interaction," Advanced Manufacturing Systems and Technology (2011) pp. 249-260.

Praxair Technology Inc, "The RealWeld Trainer System: Real Weld Training Under Real Conditions" Brochure (2013) 2 pages.

Wuhan Onew Technology Co Ltd, "ONEW-360 Welding Training Simulator" http://en.onewtech.com/_d276479751.htm as accessed on Jul. 10, 2015, 12 pages.

Miller Electric Mfg Co, "LiveArc: Welding Performance Management System" Owner's Manual, (Jul. 2014) 64 pages.

Miller Electric Mfg Co, "LiveArc Welding Performance Management System" Brochure, (Dec. 2014) 4 pages.

\* cited by examiner

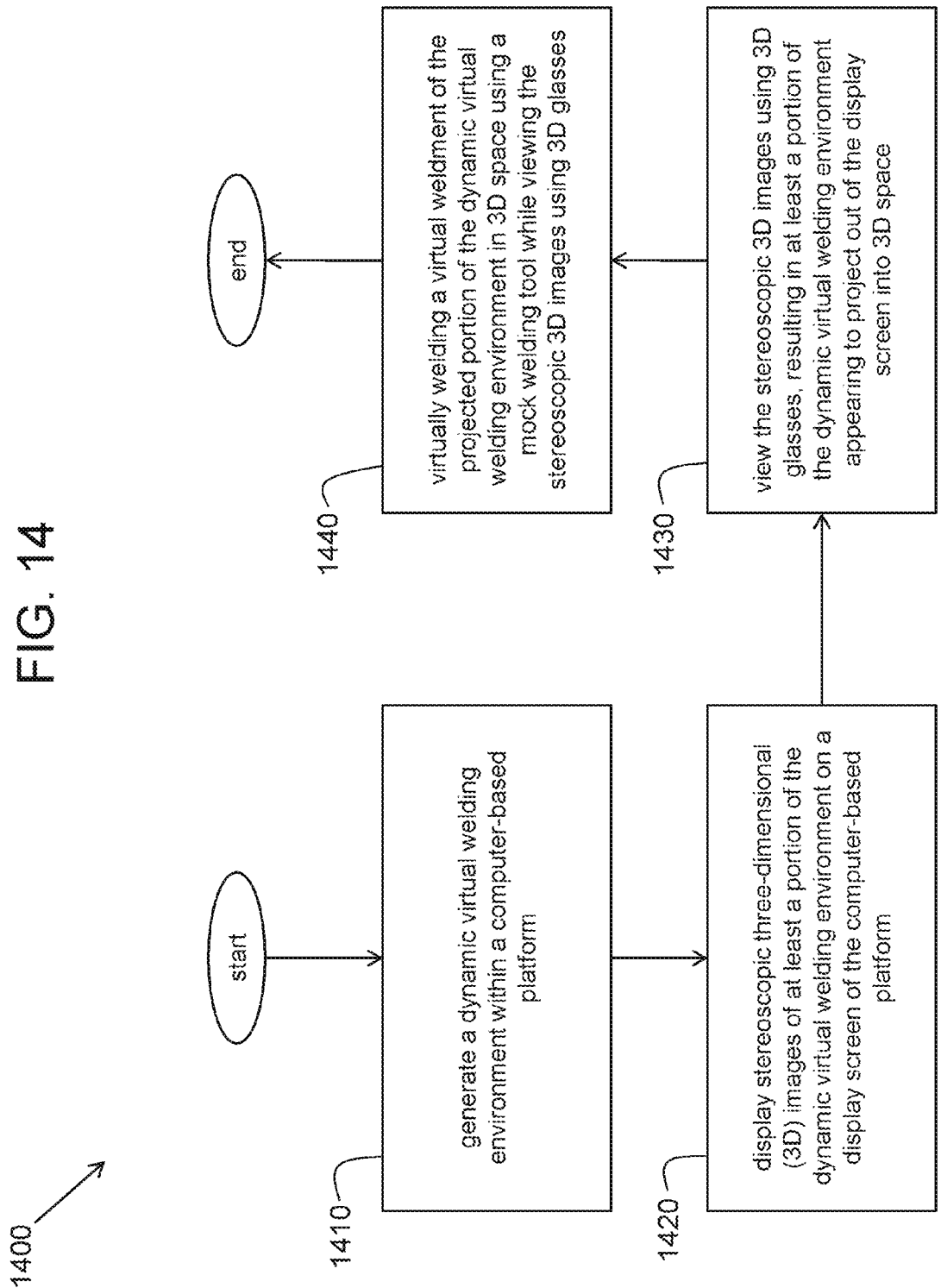

TABLET-BASED WELDING SIMULATOR

This U.S. patent application claims priority to and is a continuation-in-part of U.S. patent application Ser. No. 12/504,870 filed on Jul. 17, 2009, which is incorporated herein by reference in its entirety, and which claims priority to U.S. provisional patent application Ser. No. 61/090,794 filed on Aug. 21, 2008.

TECHNICAL FIELD

The present invention pertains to methods and systems for introducing potential new workers to the field of welding, and more particularly, to computer generated virtual environments that simulate welding processes.

BACKGROUND

In recent decades, welding has become a dominant process in the manufacture and construction of various products. Applications for welding are widespread and used throughout the world for the construction of ships, buildings, bridges, vehicles, and pipe lines, to name a few examples. Many welding tasks can be automated reducing the need for skilled labor. However, automated welding applications must be set up and managed by knowledgeable welders. Other welding applications aren't confined to a factory floor. Applications, including the construction of pipe lines or buildings, are welded in the field and require the mobility of an experienced welder. Accordingly, there is ongoing need for trained personnel who can adapt to the challenges of welding processes.

The demand for skilled welders remains high, despite reductions in manufacturing, in many regions of the world. In the United States, the average age of the welding professional is increasing, with many individuals approaching retirement age. Over the next decade, the number of available experienced welders is expected to significantly decline as workers retire from the welding profession. Many young people entering the workforce today are choosing advanced education over skilled trades and many of those workers entering the trades are dissuaded from a career in welding despite good working conditions. Programs and organizations promoting S.T.E.M. (Science Technology Engineering Math) and S.T.E. (Science and Technology/Engineering) education are valuable in revitalizing the interest of individuals in technology related fields.

BRIEF SUMMARY

The embodiments of the present invention pertain to a computer program product and processor based computing system that provides processing means for executing coded instructions and input means for interacting with said processing means to create a virtual welding environment. The system establishes an objective to change a functional or operational state of a virtual article, and directs the end user to perform at least one virtual welding operation for changing its functional state.

One embodiment provides a tablet-based computing device. The tablet-based computing device includes a touch-screen display and computer memory storing at least one welding software application providing a virtual welding process. The tablet-based computing device further includes processing means operable to execute coded instructions of the at least one welding software application to generate an interactive virtual welding environment and to display the interactive virtual welding environment on the touch-screen display. The tablet-based computing device also includes an input means configured to interact with the touch-screen display when manipulated by a user to direct at least a spatial orientation of a virtual welding tool in the virtual welding environment while performing a virtual welding activity corresponding to the virtual welding process.

Another embodiment provides a tablet-based computing device or tablet. The tablet includes a display, wireless communication means, and computer memory storing at least one software application. The tablet also includes processing means operable to execute coded instructions of the at least one software application. The coded instructions are executed to access at least one virtual reality welding system via the wireless communication means to download user virtual welding activity information from the at least one virtual reality welding system to the tablet. The coded instructions are also executed to generate a summary of user virtual welding progress based on the user virtual welding activity information, and display the summary of user virtual welding progress on the display.

A further embodiment provides a method of virtual welding. The method includes generating a dynamic virtual welding environment within a computer-based platform and displaying stereoscopic three-dimensional (3D) images of at least a portion of the dynamic virtual welding environment on a display screen of the computer-based platform. The method further includes viewing the stereoscopic three-dimensional images using 3D glasses, resulting in at least a portion of the dynamic virtual welding environment appearing to project out of the display screen into 3D space. The method also includes virtually welding a virtual weldment of the projected portion of the dynamic virtual welding environment in 3D space using a mock welding tool while viewing the stereoscopic three-dimensional images using 3D glasses.

BRIEF DESCRIPTION OF THE DRAWINGS

FIG. 14 is a flowchart of an example embodiment of a method of virtual welding.

DETAILED DESCRIPTION

Figure 1:
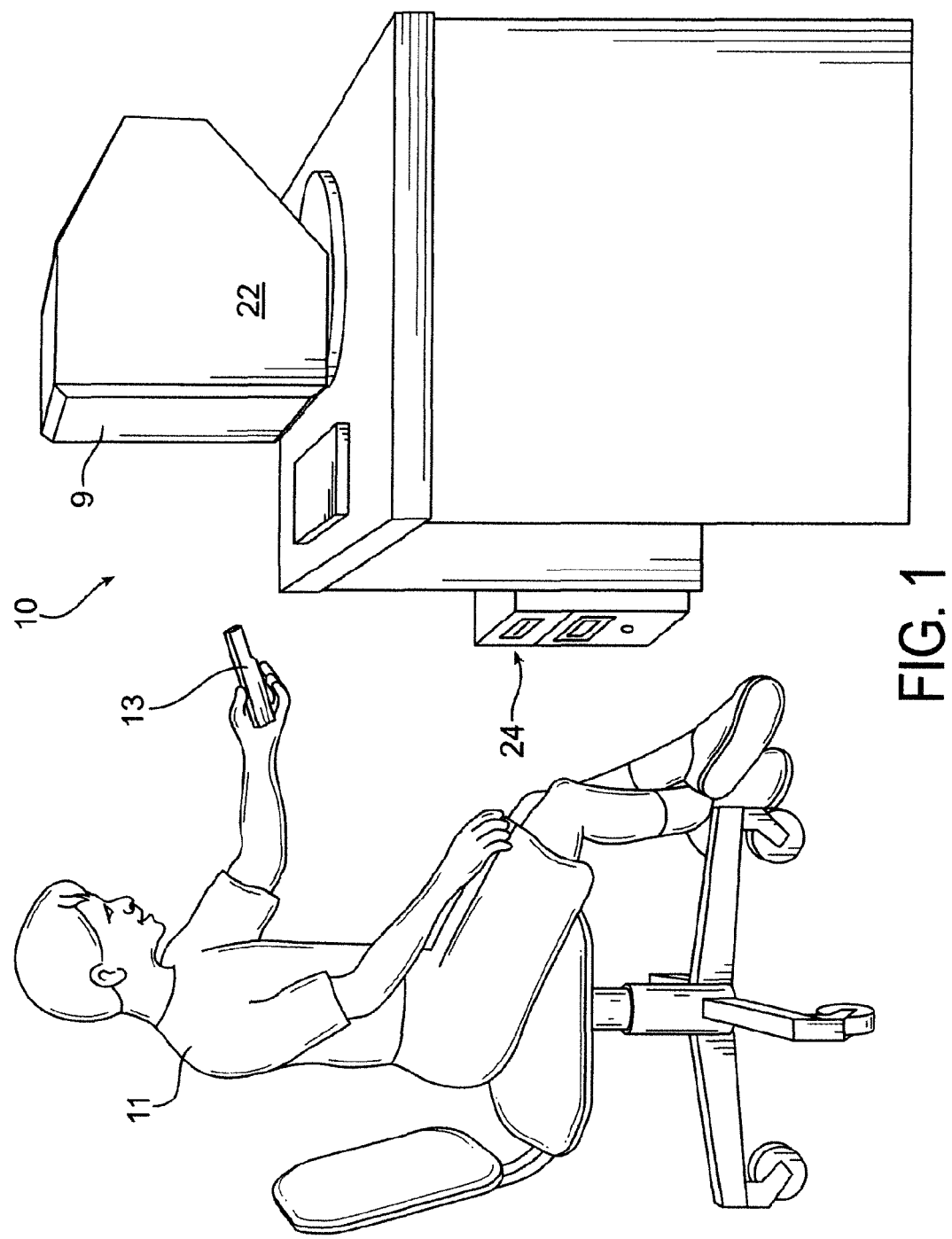
FIG. 1 is a perspective view of a simulating device and end user according to the embodiments of the subject invention.
Figure 2:
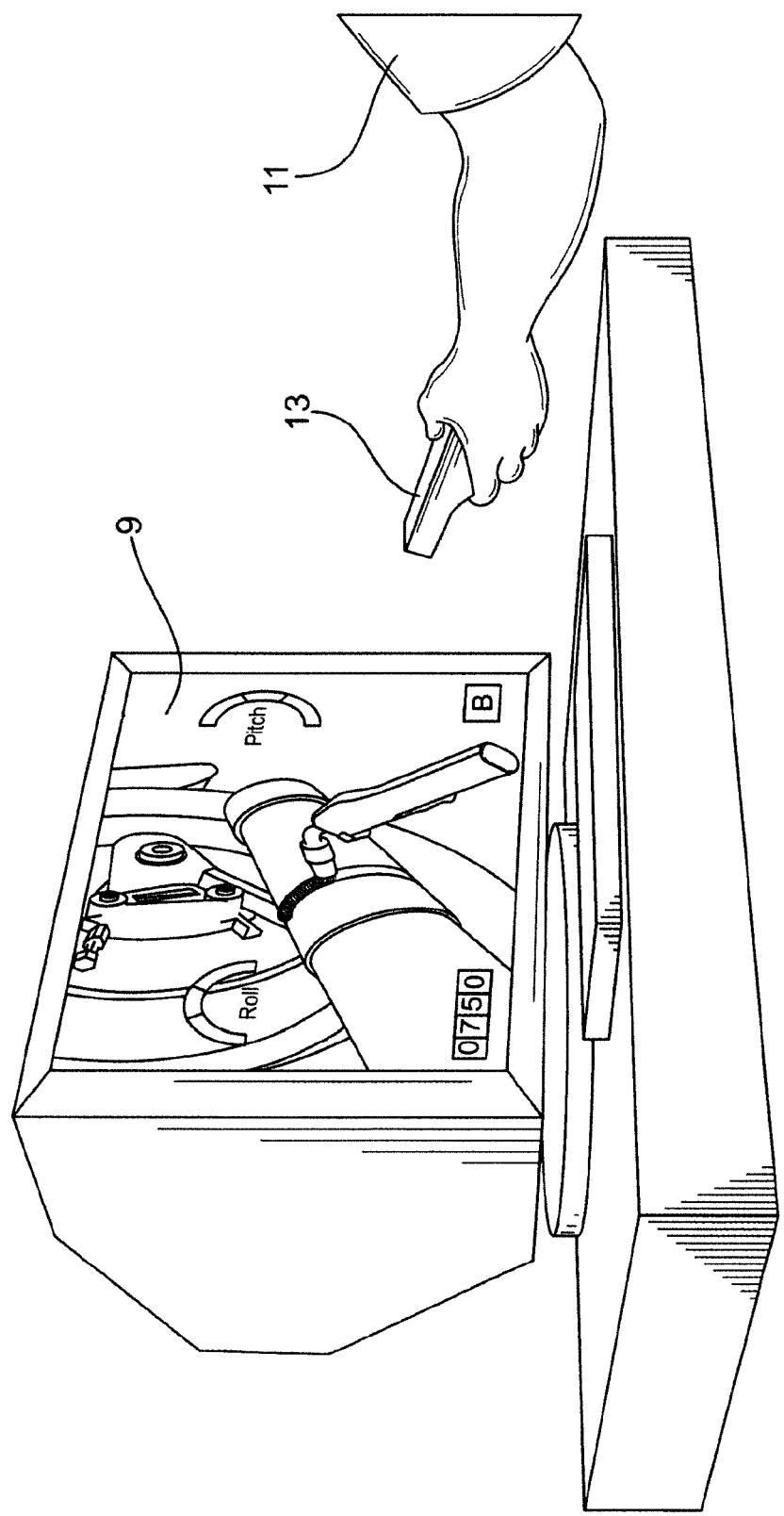
FIG. 2 is a close up perspective view of a simulating device depicting a virtual environment according to the embodiments of the subject invention.

Referring now to the drawings wherein the showings are for purposes of illustrating embodiments of the invention only and not for purposes of limiting the same, FIGS. 1 and 2 shows a simulator or simulating device depicted generally at 10. The simulating device 10 generates a virtual environment 9 that simulates a three dimensional setting, which may be an industrial or commercial setting utilizing one or more manufacturing processes. The virtual environment 9 may be depicted on an imaging device 22 as viewed by an end user 11. In particular, the simulating device 10 may depict a virtual environment 9 that facilitates interaction between the end user 11 and one or more virtual articles 16. An input device 13 may be included that senses activity when manipulated by the end user 11. Data from the input device 13 may be communicated to the simulating device 10 and is used to maneuver objects with the virtual environment 9 in or near real time. In one embodiment, the simulating device 10 functions to generate one or more virtual articles 16 that can be acted upon by virtual tools generated in a similar manner. It follows that the virtual tools may be employed in the virtual environment 9 when the input device 13 is maneuvered by the end user 11 in the real world.

The simulating device 10 may generate a virtual environment 9 having virtual articles 16 that resemble components of a particular manufacturing or construction process. In one embodiment, the virtual environment 9 may comprise a welding environment depicting one or more articles for assembly together via a welding process. Accordingly, the virtual tools may comprise a welder 32 and welding torch 34. In this manner, the simulating device 10 displays virtual articles 16 being welded together by a virtual welder 32 as interactively controlled by the end user 11. The simulating device 10 may be realized as a training platform for exposing individuals to a particular manufacturing process, or may be realized as a game played to achieve a stated objective, both of which will be discussed further in a subsequent paragraph. It is expressly noted that while the embodiments of the present invention are described in the context of a virtual welding environment 9 and one or more welding process, persons of skill in the art will understand its application to other industrial or commercial processes.

With continued reference to FIG. 1, the simulating device 10 may be constructed of electronic hardware comprising a processor based computing device 24 operable to run, i.e. execute, a computer program product. In one embodiment, the processor based computing device 24 comprises a microcomputer in any of various configurations including but not limited to: a laptop computer, a desktop computer, work station, server or the like. Alternatively, the processor based computing device 24 may comprise a gaming system like that manufactured by Nintendo®, Microsoft® or Sony®. In this manner, the processor based computing device 24 may be a commercially available system readily available for purchase by an end user 11. The processor based computing device 24 may include one or more logic processor based systems, or logic processors, such as a programmable microprocessor, although any type of logic processor may be utilized in the simulating device 10 without departing from the intended scope of coverage of the embodiments of the subject invention. The processor based computing device 24 may further include support circuitry including electronic memory, such as RAM or ROM along with other peripheral support circuitry that facilitate operation of the logic processor(s). Additionally, the processor based computing device 24 may include data storage, examples of which include hard disk drives, optical storage devices and/or flash memory for the storage and retrieval of data in a manner well known in the art. Thus, the processor based computing device 24 may be programmable and operable to execute coded instructions, as also referred to as programmed algorithms, which may be a computer program product written in a high or low level programming language. It is noted that any form of programming or type of programming language may be used to code algorithms as executed by the simulating device 10 for simulating the virtual environment 9.

The simulating device 10 and, more particularly, the processor based computing device 24 may be communicated to and used in conjunction with other similarly or dissimilarly constructed systems. Input to and output from the simulating device 10, termed I/O, may be facilitated in this embodiment by networking hardware including wireless as well as hard wired (directly connected) devices. Communication between simulating devices 10, or systems, may be accomplished remotely as through a network, like a wide area network (WAN) or local area network (LAN) via network hubs, repeaters, or by any means chosen with sound judgment. Communications may be established through, but are not limited to: direct connection of multiple simulating devices 10, web-based connectivity, virtual private networks, and/or SSL (Secure Sockets Layer) encrypted communication. It is noted that the relationship between simulating devices 10 may be peer-to-peer, client-server, or any hybrid combination thereof without departing from the scope of coverage of the embodiments of the subject invention. In this manner, information may be transmitted between systems 10 as is useful for simulating or interacting with the virtual environment 9. In one embodiment, network communications may be used to download virtual articles 16 or virtual tools for changing the game scenario. Alternatively, new environments may be downloaded for training a different manufacturing process, the details of which will be discussed further below. It is further contemplated in another embodiment that the simulating device 10 may generate a virtual environment 9 that may be acted upon by multiple end users 11 each working from the same system or separate systems networked together. Still, any manner of communicating one or more simulating devices 10 together may be utilized without departing from the intended scope of coverage of the embodiments of the subject invention.

With continued reference to FIGS. 1 and 2, the simulating device 10 may include an imaging device 22 for displaying the virtual environment 9, which may be a virtual welding environment 9. The imaging device 22 may comprise a display screen operable to display images generated by the processor based computing device 24 and the computer program product. In one embodiment, the display screen may include a computer monitor and/or television screen comprised of CRT (Cathode Ray Tube) or LCD (Liquid Crystal Display), although any type of monitor, screen, display, or projection device may be utilized as is appropriate for the embodiments of the subject invention. Information for generating the images on the display screen may be stored in memory within the processor based computing device 24. As memory is updated or changed during execution of the computer program product, images on the display screen may be dynamically changed in real time. Still any method or means for displaying the virtual environment 9 on the imaging device 22 may be chosen as is appropriate for use with the embodiments of the subject invention.

Figure 3:
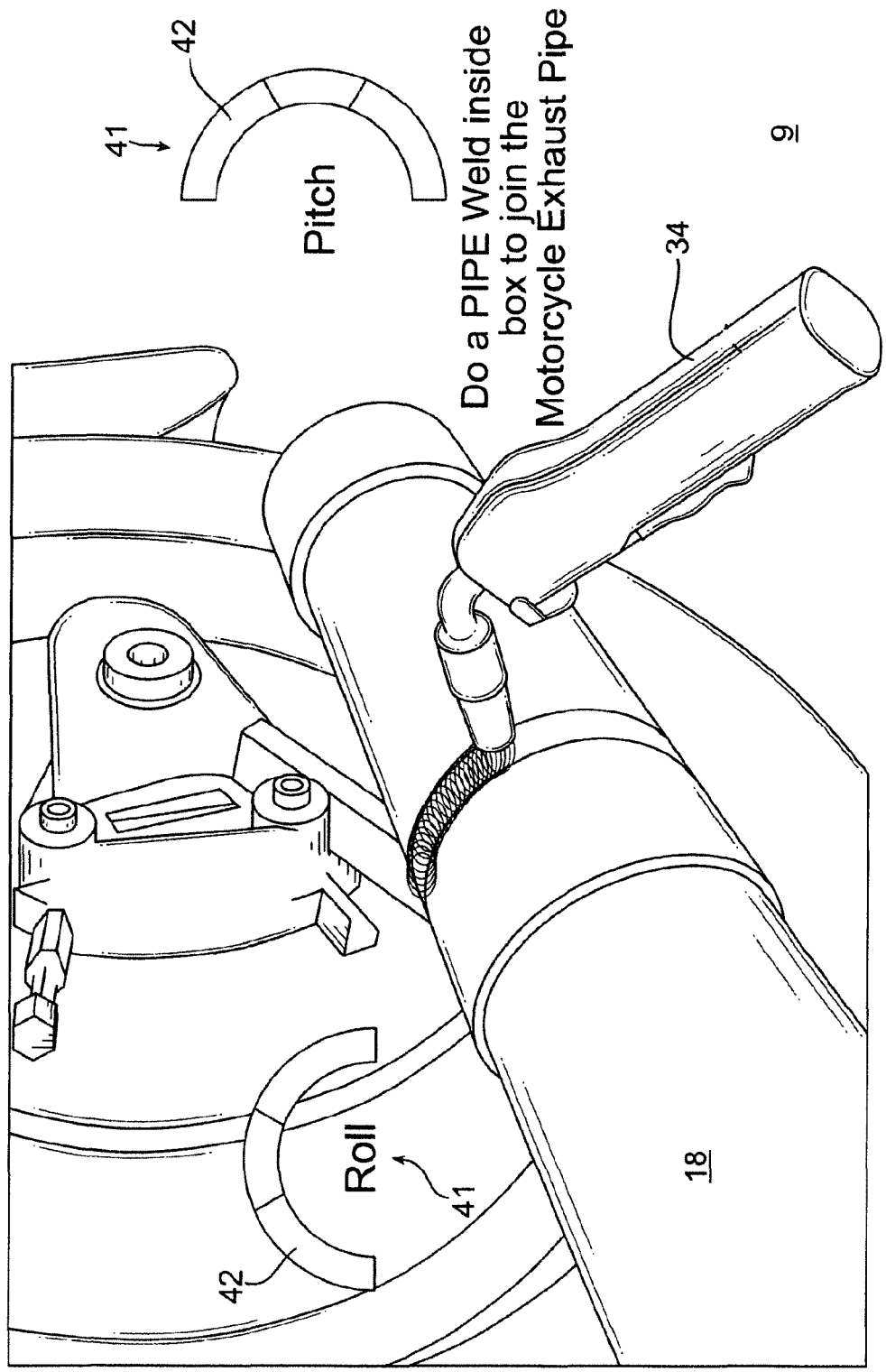
FIG. 3 is an image of a virtual environment showing a virtual article according to the embodiments of the subject invention.

With reference now to FIGS. 2 and 3, the input device 13 may function to interface activity in the real world with the virtual environment 9. In particular, the input device 13 senses the actions of the end user 11 and translates those actions into data recognizable by the simulating device 10. The data is communicated to the logic processors and may be used to interactively engage the virtual tools and/or the virtual articles 16. In one embodiment, the computer program product processes the data and makes changes to the virtual environment 9 in real time. In this manner, as the end user 11 manipulates the input device 13 in three dimensional space, objects in the virtual environment 9 move in a corresponding manner, i.e. in direct relationship to movement of the input device 13. For example, the end user 11 may visualize one or more virtual objects on the imaging device 22, including a virtual representation of a real world tool. Accordingly, the end user 11 may move the input device 13 in a particular direction resulting in a corresponding movement of the virtual object. In the welding embodiment illustrated herein, the input device 13 may represent the welding torch 34. Movement of the input device 13 therefore translates into movement of the virtual welding torch 34 in the virtual environment 9. The input device 13 may include switches that activate the virtual welder thereby initiating the welding process. The end user 11 may then guide the input device 13 along a trajectory that coincides with the weld joint as depicted on the imaging device 22.

Still referring to FIG. 2, the input device 13 may include one or more sensors that detect movement and/or orientation in three dimensional space. The sensors may be integrated into the input device 13 and positioned at various locations for detecting different types of activity. For example, the sensor, or sensors, may detect spatial orientation, i.e. the direction that an object is pointing, as mentioned above. The sensors may also detect motion in a particular direction. Additionally, the sensors may detect velocity and/or acceleration, which may encompass not only the magnitude of change in position or speed, but also direction. However, any type of activity related to the input device 13 may be detected by the sensors without departing from the intended scope of coverage of the embodiments of the subject invention. Examples of sensors may include but are not limited to: inertial sensors like accelerometers, proximity sensors, infrared sensors, photoelectric and optical sensors, and the like. It is noted here that the input device 13 may further incorporate switching means for interfacing with the virtual environment 9. The switching means may include: pushbuttons, triggers or switches. In this way, virtual activity may be initiated, interrupted, or terminated as desired by depressing or releasing the switch respectively. Illustratively, the virtual welder 34 may be turned "on" or "off" by depressing or releasing a trigger switch. It is to be construed that any type, quantity or grouping of sensors or switching means may be integrated into the input device 13 as chosen with sound judgment. Still other means of tracking movement of the input device 13 may be included as a separate unit that resides in an adjacent region proximal to the coupon. Position and/or orientation data generated by the tracker, i.e. tracking means, may be used in conjunction with or in place of data generated by the input device 13.

In one embodiment, the input device 13 may be commercially available for purchase and use. One example may include a manually moveable device, like a computer mouse having an optical sensor for detecting movement along an adjacent surface. Another example of input device 13 may comprise a gaming joystick or controller, which may include a connector for plugging into an I/O port or may include wireless means for communication. The Wii wireless controller manufactured by Nintendo® is one exemplary type of input device, although other commercially available controller devices may be utilized as are suitable for use with a particular processor based computing device 24. Other embodiments contemplate customized controllers, which may be fashioned to physically look like a particular virtual tool, e.g. a welding torch 34. Interaction with the simulating device 10 is thereby enhanced by a physical object having a real world feel and look that resemble the virtual tools depicted on the imaging device 22. It is noted that the customized controller may be substantially similar in size, shape and/or weight to the real world tool for which the controller is intended to resemble. Other embodiments include an attachment that connects to the commercially available input device 13 and resembles a particular virtual tool 26 to enhance the end user's experience in interacting with the virtual environment 9. In one embodiment, the attachment may be an overlaying component and/or a component that attaches to and extends from the input device 13. However, it is expressly noted that any configuration of customized controller or attachment may be chosen as is appropriate for use with the embodiments of the subject invention. Accordingly, at least part of the simulating device 10 may be packaged as a kit for use with any type of processor based computing device 24, commercially available or otherwise. In another embodiment of the subject invention, the kit may include a welding coupon that may resemble a virtual article 16 displayed in the virtual environment 9. Accordingly, the welding coupon may function as a guide in the real world for assisting the end user in acting in the virtual environment 9. The kit may also comprise tracking means like that mentioned above. In other words, a tracking unit may be provided in addition to the input device 13 for sensing the end user's 11 movement during play.

Figure 4:
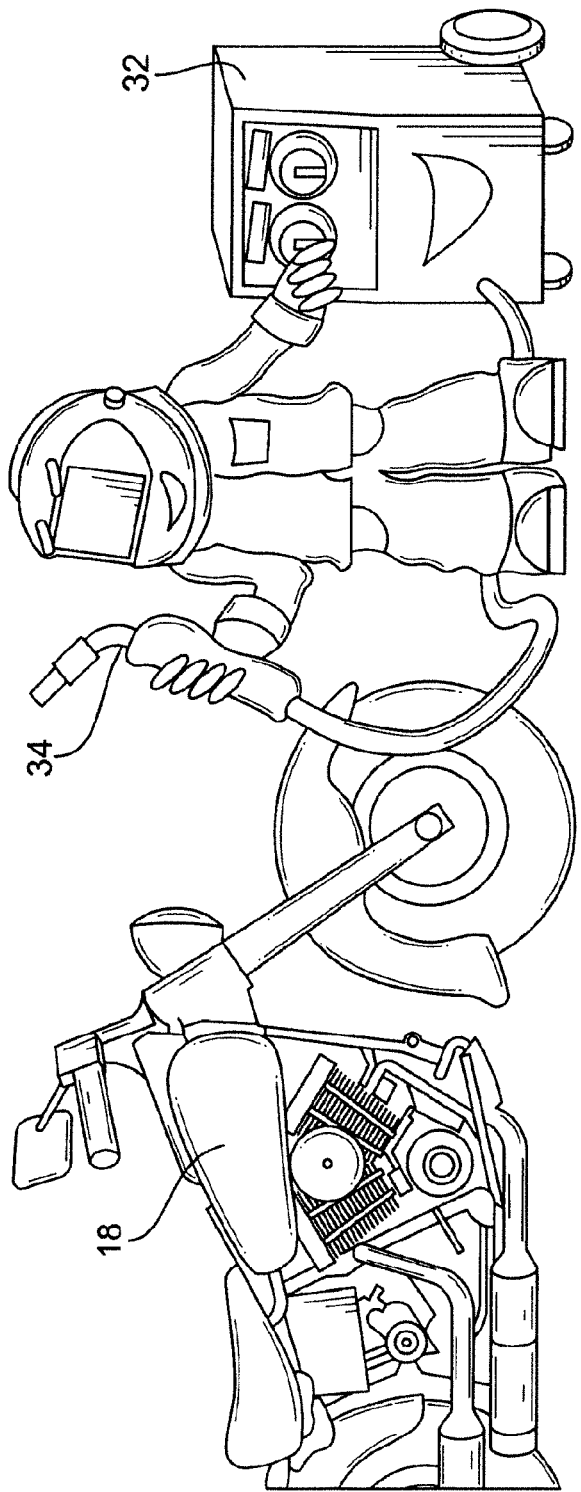
FIG. 4 is an image of a virtual environment showing a virtual article and user interface screen according to the embodiments of the subject invention.
Figure 6:
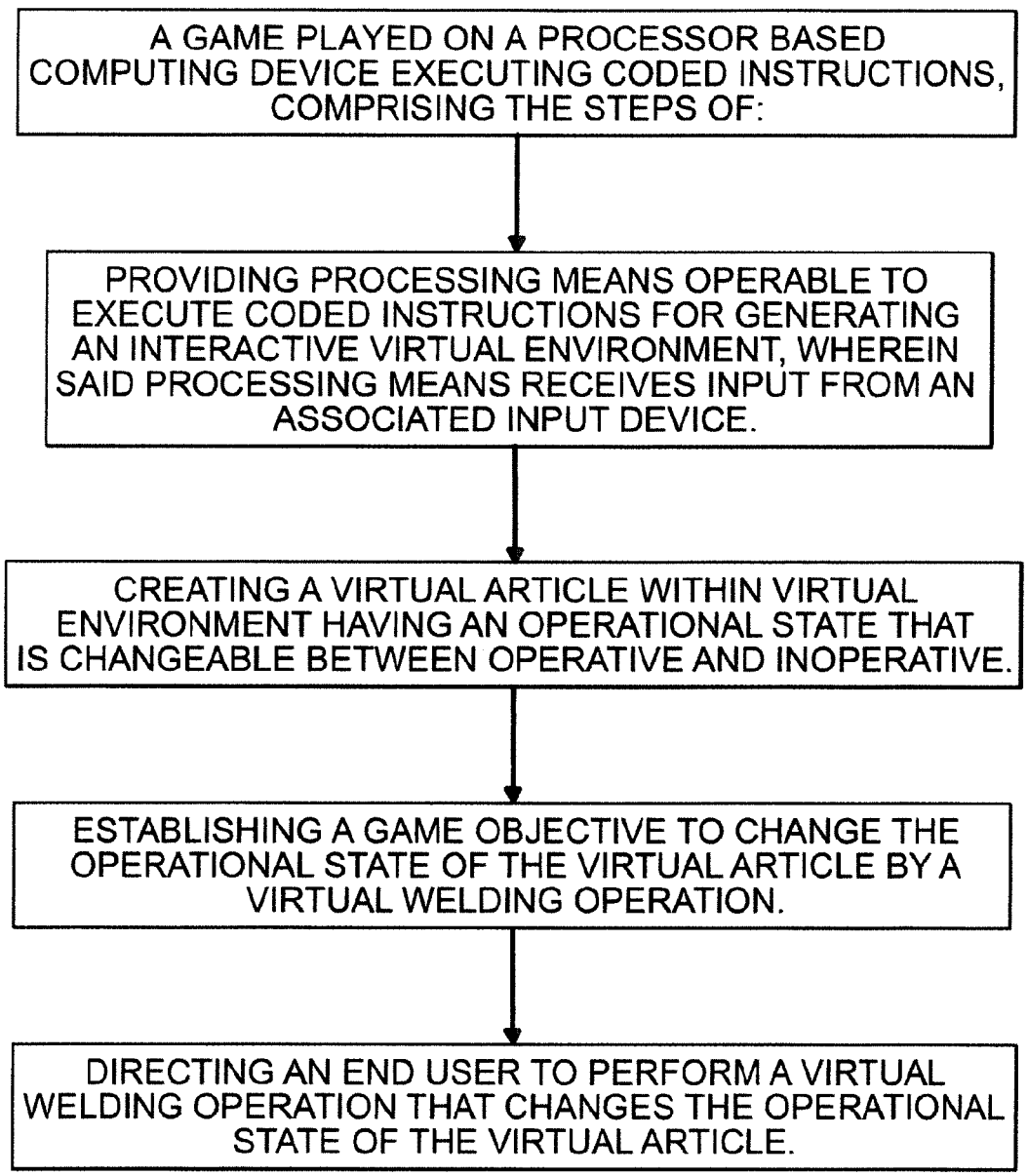
FIG. 6 is a block diagram depicting a method of a game played on a processor based computing device executing coded instructions.

With reference to FIGS. 3, 4 and 6, the simulating device 10 may comprise a game having a stated objective to be accomplished by the end user 11. In one particular embodiment, the game may comprise a welding game where the objective is to weld one or more virtual articles 16 together. Achieving the objective may require the end user 11 to perform a number of welds each to a predetermined level of quality. That is to say that the game facilitates user interaction with processor based computing device 24 via the input device 13 for satisfactorily performing one or more virtual welds in the virtual welding environment 9. During play, the game presents the end user 11 with a scenario incorporating one or more themed virtual articles 18. Illustratively, the scenario may relate to motorized vehicles and may depict a number of virtual components that can be welded together to assemble a functioning motorcycle or racecar. In another exemplary scenario a jet aircraft is simulated that is in need of repairs, which may require welding before taxiing down the runway and taking off. Other examples include building structures or bridges that require repair or construction before people occupy the building or the train crosses the bridge respectively. However, any scenario theme may be chosen without departing from the intended scope of coverage of the embodiments of the subject invention. It will be realized that the game rewards successful completion of the objective, in one manner, by graphically displaying the themed article functioning in its environment, e.g. the motorcycle drives away or the train crosses the bridge. The simulating device 10 also takes in account the personal interests of the end user 11. In one embodiment, the game gives the end user 11 the option of selecting a scenario that is familiar increasing his or her level of interest. Accordingly, the game may be programmed with multiple scenario options for appeal to a broad range of individuals.

From the aforementioned description, it follows that the themed virtual article 18 of the scenario has some deficiency that requires repair or assembly before becoming operational. During game initialization, i.e. game start up, the themed virtual article 18 may be instantiated having an inoperative state or, in other words, is created not working properly or not working at all. In the present examples, the initial "inoperative" state may be represented and simulated by one or more broken brackets, a stack of unassembled I-beams, a cracked pipe, or any repairable element fitting the scenario theme. Accomplishing the game objective therefore requires the end user 11 to interact with the virtual environment 9 to perform virtual welding that changes the operational state of the themed virtual article 18. It is noted here that accomplishing the game objective may require successful completion of multiple levels of play. That is to say winning the game requires successfully changing the operational state of each virtual article 18 in every level of play.

At an introductory level, the game displays one or more virtual articles 16 that correspond to the scenario selected by the end user 11. The end user 11 is then instructed to perform a particular type of weld relating to the deficiency of the virtual article 16. It may be assumed that the end user 11 has little or no welding experience. Accordingly, a tutorial may be provided that presents information to the end user 11 about the welding process or welding techniques needed for achieving the objective for that level. Display of the tutorial may be initiated or controlled by the end user 11 via a graphical user interface (GUI), in one example, as selected by a "help" button. In the alternative, tutorial screens may automatically be presented if the end user's performance falls below a satisfactory level. In one exemplary manner, the instructions may be displayed in written form, an example of which may include a setup screen. Instructions may also be provided audibly and, more specifically verbally, to describe the process and/or motions needed to complete setup and a particular welding task. In either case, the instructions may be presented in one of a plurality of languages to accommodate individuals residing in different regions of the world. One embodiment is contemplated where the game graphically or pictorially presents tutorial information. In this instance, literacy of the end user 11 is not required to play the game.

Game play proceeds as the end user 11 engages the input device 13 to mimic movements characteristic of performing a weld. Progression through the game may depend on how well the end user 11 performs a virtual weld, which may relate to the level of virtual weld quality. In this manner, advancing to the next level, as will be discussed further in a subsequent paragraph, requires successful completion of the previous game stage. In making that determination, one or more parameters may be measured to determine the level of virtual weld quality. In processes well known in the real world, weld quality depends on many factors like the distance between the torch tip and the weld joint, which may vary with the type of welding process, the materials being welded, the welder settings, and the like. Corresponding real world parameters may be coded into the computer program product for judging the end user's 11 performance and for determining the quality of the virtual weld.

Completion of a particular game level may require the end user 11 to perform the one or more virtual welds to predetermined performance standards as determined by the computer program product. Performance parameters may be programmed into the computer program product that correlate to good welding practices and may consist of: weld torch 34 position, roll and pitch angles of orientation and travel speed. Sensor data from the input device 13 may be compared to preprogrammed parameters to determine whether or not the end user 11 has stayed within acceptable limits. In one particular embodiment, weld quality may be determined by monitoring the distance between the torch tip in relation to the center of the weld seam while maintaining proper pitch and roll angles during the virtual welding process. However, it is to be construed that other parameters may be utilized in determining if the end user 11 has successfully completed a virtual weld.

In one embodiment, the simulating device 10 provides or calculates a score resulting from game play. The score, which may also be a grade, may be derived from the performance data of the end user 11. Performance data may pertain to how well the end user 11 performs the virtual weld, that is to say how closely the end user 11 maintains the virtual tools or welding torch 34 within limits for acceptable welding practices. Examples may include but should not be limited to, welding torch angle or distance to the virtual article 16 The score or grade may also be derived from end user selections made with respect to the problem-based scenarios as will be discussed further in a subsequent paragraph.

Simulating device 10 may provide feedback to help the end user 11 in performing the virtual welds. In the real world, a welder receives feedback by observing the weld bead as the torch travels along the weld joint. The simulating device 10 may similarly depict a virtual weld bead correlating to the end user's movement of the virtual welding torch 34. In one embodiment, the shape of the virtual weld bead is determined by factors including torch angle, travel speed and distance to the work piece, as well as welding power source settings, although other factors may be incorporated as is appropriate for use with the embodiments of the subject invention. In this manner, the end user 11 can make adjustments during the virtual welding process for laying down an acceptable weld bead thereby simulating real world activity.

Figure 5:
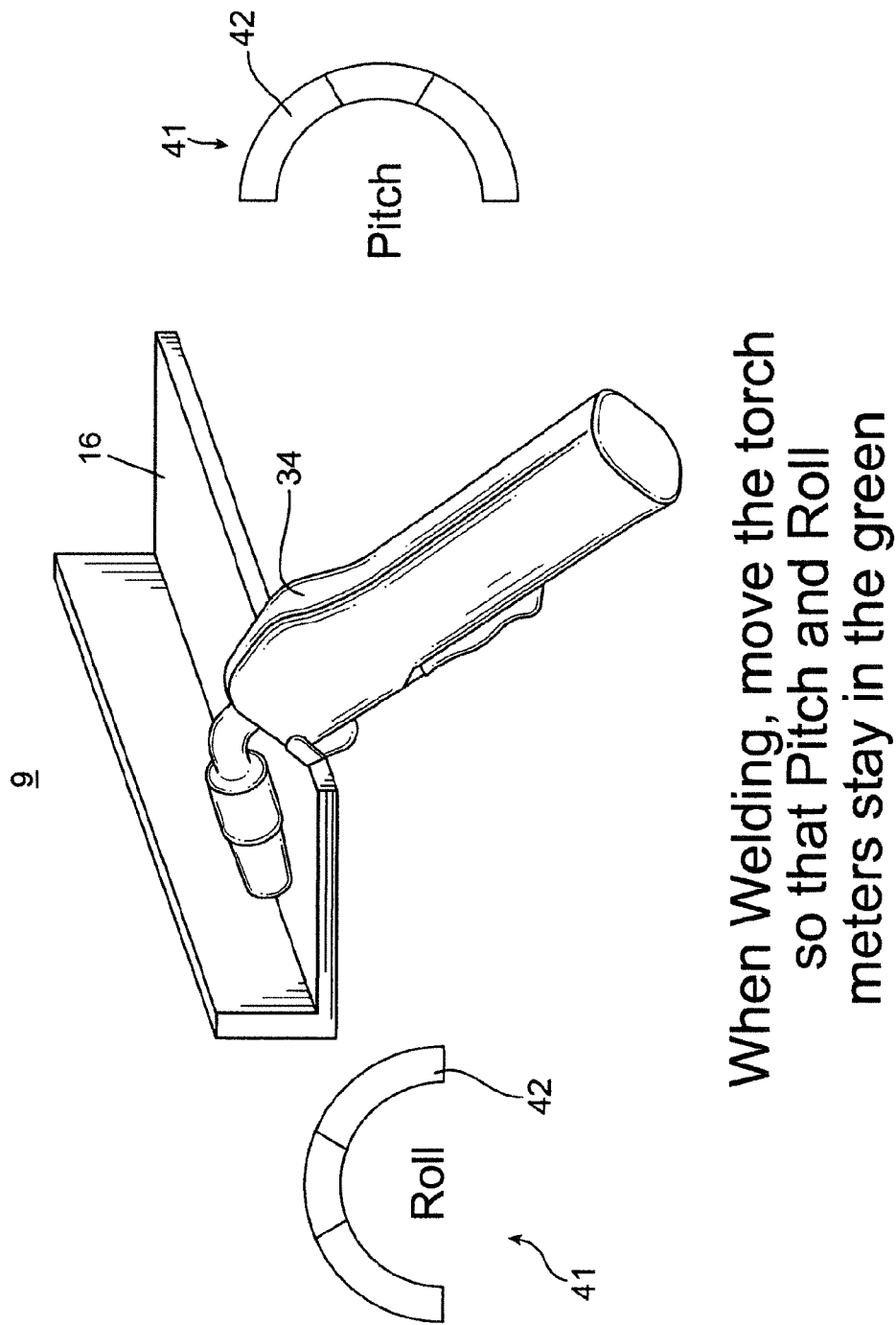
FIG. 5 is an image of a virtual environment showing a user interface screen according to the embodiments of the subject invention.

Referencing FIG. 5, to further assist the end user 11, performance guides 41 may be included that provide quantitative feedback on the position and orientation of the virtual welding torch 34. In one particular embodiment, "indicating bars" 42 are included that show the pitch and roll angles of the virtual welding torch 34. Other types of performance guides 41 are contemplated that display the distance between the torch tip and the weld joint. Additional welding parameters incorporated into the performance guide 41 will become apparent to those skilled in the art.

The performance guides 41 may display the actual numerical values of the torch position, which in the current embodiment shows pitch and roll angles. The values displayed may show the angles as measured from an absolute reference like the vertical or horizontal plane. Alternatively, the performance guides 41 may display angle values that relate to offsets from the ideal torch position or orientation. The performance guide 41 may indicate which values are outside the range for achieving an acceptable weld. In one embodiment, the performance guides 41 may flash, change color and play an audible sound that indicates when the welding torch 34 is out of position. In this way, the end user 11, through repeated use, learns correct welding techniques. As the end user 11 gains experience, he or she will naturally maintain the welding torch 34 at the proper orientation throughout the entire welding process. At one point, it may no longer be necessary to display the performance guides 41. Accordingly, the computer program product may be programmed to selectively turn the guides 41 "on" or "off."

As previously mentioned, the game may incorporate different levels of play. The levels may be differentiated by scenario, i.e. by changes in the themed subject articles 18 being welded. Alternatively, the levels of play in a particular scenario may differ by the types of weld joints and/or the number of virtual article pieces to be welded together. For example, a more fundamental level may simulate welding a single lap joint embodied by overlaid frame components of building structure. Another level of play may simulate performing a pipe weld as found on a motorcycle tailpipe or pipeline. Still, other examples are contemplated wherein overhead or vertical butt joints are to be welded for repairing the frame of motor vehicle. At each game level, the welding objectives must each be performed to within predetermined quality boundaries in succession, before proceeding to the next level. In this way, basic welding skills may be taught by progressively introducing increasingly complicated weld joint configurations and more advanced welding techniques.

The game objective may be accomplished when the end user 11 successfully performs, i.e. meets or exceeds predetermined limits of weld quality for, all of the virtual welds in a given scenario. That is to say that the end user 11 performs each weld on every level to a minimum standard for quality. Alternative game objectives may be included that are accomplished by exceeding a virtual weld performance average over the various levels. Consequently some levels of play may be performed below the performance minimums with others commensurately above. The game objective is met as long as the weighted average for the entire game exceeds a predetermined minimum.

In judging the end user's 11 performance, the simulating device 10 may track the movements of the end users 11 through the input device 13 and compare the data with parameters stored in memory, or coded into the computer program product. The data and/or parameters may be stored in a database, or by any means of data storage chosen with sound judgment. In one embodiment, the simulating device 10 records and stores information about the end user's 11 performance for comparison at a time subsequent to the virtual activity. In other embodiments, comparison with the welding quality parameters is performed in real time with the results being dynamically displayed or catalogued for subsequent review. In addition to the data collected via the input device 13, other types of data may be captured, which include: time and date data, user name, scenario, as well as game status data. It will be appreciated that any type of data may be tracked and stored as needed for determining and reporting the results of game play.

Figure 7:
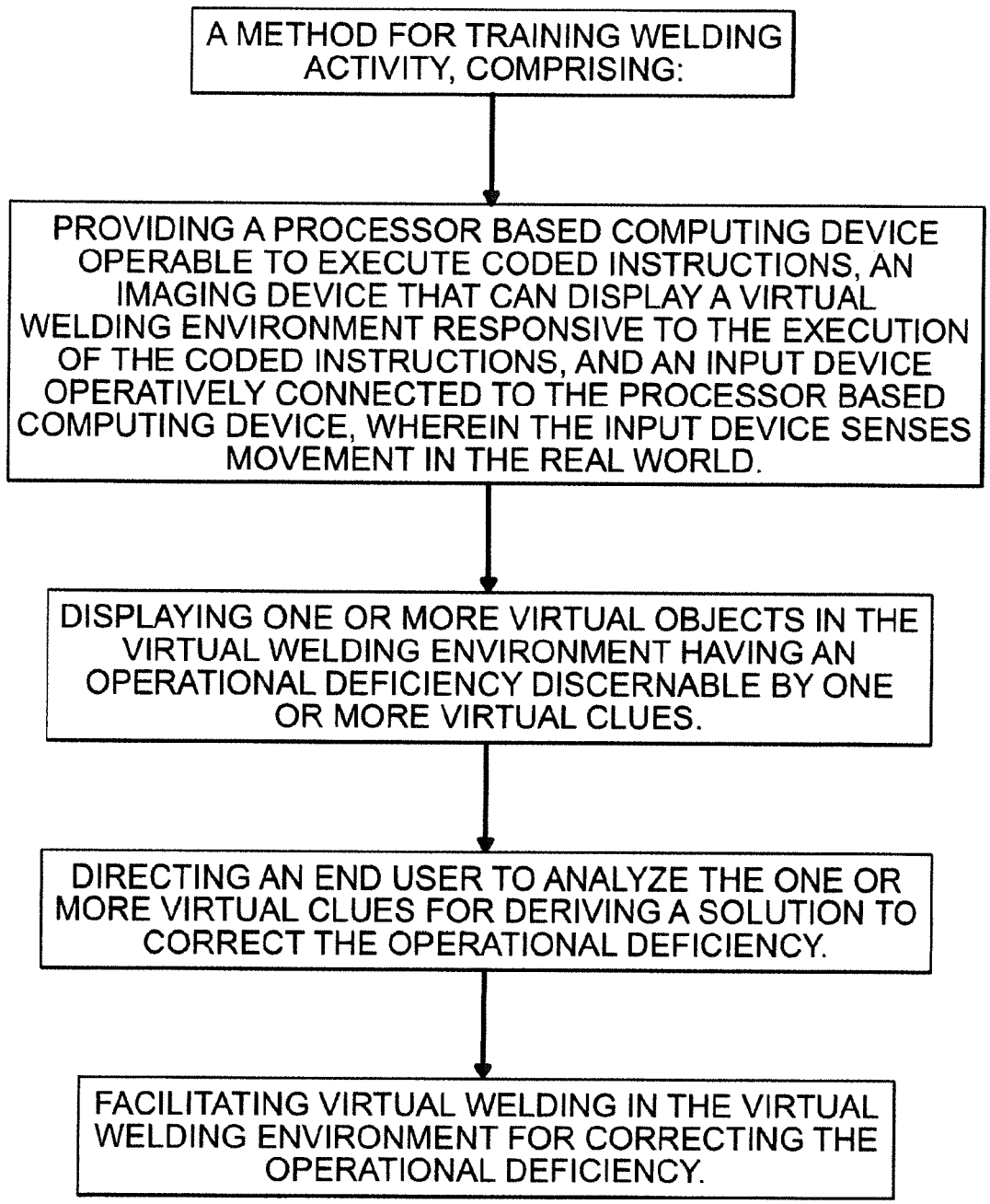
FIG. 7 is a block diagram depicting a method for training welding activity.

With reference now to FIG. 7, as mentioned above, the simulating device 10 may also comprise a system that facilitates training skills used in industrial or commercial settings. In one exemplary embodiment, the simulating device 10 may depict a virtual welding environment 9 featuring scenarios having one or more themed articles 18 consistent with that described above. The simulating device 10 may present the end user 11 with a problem to be solved, e.g. a building structure that needs assembled or a race car frame that needs repaired. The problem may be expressly stated whereby the end user 11 is directly tasked with solving the problem given a set of virtual tools. Instructions may be presented describing how the problem should be fixed including which welding techniques or processes should be used. The simulating device 10 may also indicate welder settings or ranges of settings that are needed to weld the virtual article(s) 16 for the given scenario. Additionally, the simulating device 10 may indicate what type of electrode is needed for a particular repair, and/or at what travel speed the weld should be made to make an acceptable virtual weld, which may correspond to a real world weld. However, any type of instruction may be presented to the end user 11 for assembling or repairing the virtual articles 16. It is once again noted that instructions may be displayed in text or audibly presented in any one of various languages, and/or graphically displayed with graphics as is appropriate for different training settings.

As the end user 11 advances, the level of instruction may be adjusted accordingly. At beginner levels, the level of instruction may focus on fundamentals relating to, for example, welding theory, basic welding practices and/or welder set up. Other training levels may provide tutorials related to various weld joint configurations and/or welding with different types of materials and electrodes. More advanced levels may concentrate on particular welding processes and techniques. Of course, each level may be enhanced by one or more scenarios simulating real world activity as described above.

In one embodiment, the welding training may include problem-based scenarios. The problem-based scenario may be characterized by incorporating an operational deficiency in a virtual article 16 that must be discovered, analyzed, and a solution formulated by the end user 11. Knowledge learned from a previous lesson or level of training may be relied on for solving the problem. In one example, a race car may be depicted and described as not functioning properly. The virtual environment 9 may be programmed to present visual, and/or audible, clues that allow the end user 11 to discern the particular problem presented for the given scenario. After analyzing the problem, the end user 11 is directed to devise a solution that, in an exemplary manner, may incorporate: selecting the appropriate welding process, adjusting the welding power supply settings, choosing a particular electrode and then performing a virtual weld. A proper repair therefore requires not only the physical motion of implementing a suitable virtual weld, but also selecting the appropriate welding process and associated parameters. A successful repair or assembly may be indicated, whereby the virtual race car drives away or drives in a race. If an improper or incomplete repair has been made, the race car may perform poorly or not at all with further clues provided to the end user 11 as to what problems remain that need to be fixed. In this manner, welding training encompasses not only the training of muscle memory to successfully perform a particular weld, but also teaches the end user 11 how to properly analyze the virtual article(s) 16 for selecting the appropriate welding process needed to correct its operational deficiency. Welding training may also encompass learning that extends beyond the training of muscle memory by incorporating weld puddle modeling that teaches the end user 11 to make adjustments during the welding process.

As mentioned above, a grade may be derived from the end user's analysis of the problem-based scenario. In one embodiment, the end user 11 may be given information regarding the virtual article's 18 base material and instructed to select an electrode appropriate for use with that base material. In the real world, selection of an electrode affects the integrity of a weld joint. Similarly selecting the right electrode in the virtual welding environment 9 affects the score or grade of the end user's 11 performance. Additionally, the end user 11 may be required to calculate the heat input to ensure that the base material properties are not permanently altered by multi-pass welds. In another embodiment, the simulating device 10 may provide the end user 11 with information related to material thickness and/or joint configuration. Accordingly, the end user 11 may be required to determine the appropriate travel speed for the virtual welding power supply settings selected in order to properly make the virtual weld. It is noted here that the information may be expressly stated or indicated by virtual cues from which the end user 11 may infer important factors needed for analyzing the problem. A combination of the aforementioned is also contemplated by the embodiments of the subject invention. It will be recognized that the simulating device 10 therefore functions to educate and evaluate proficiency in learning for science, technology, engineering and/or math as promoted by various educational and governmental institutions.

It may be required that each level of training must be satisfactorily completed before advancing to subsequent levels. In one embodiment, tests may be given related to both welding knowledge and/or virtual welding performance. Data, i.e. test data or performance data, from the current scenario may be tracked, stored and compared against pre-programmed welding parameters in a manner consistent with that described above. In areas where minimum levels of achievement have not been reached, the end user 11 may be given opportunity to review tutorials and/or practice welding a particular weld joint. Once proficiency has been demonstrated, the end user 11 may advance to progressively more difficult levels teaching new skills.

Tablet-Based Virtual Welding

Various elements, features, and functions described herein may be embodied in a tablet-based computing device. A tablet-based computing device, or tablet, is generally a mobile, one-piece device having a touch-screen display that a user may interact with via the user's finger or a stylus. Gestures of the user's finger or the stylus serve as a primary means of control and input. However, the tablet may provide additional means of control and input such as, for example, buttons, a virtual or attachable keyboard, or input from one or more sensors. For example, a stylus may have one or more accelerometers and serve as the input device 13, in accordance with an embodiment.

One embodiment provides a tablet-based computing device or tablet. The terms "tablet-based computing device" and "tablet" are used interchangeably herein. The tablet-based computing device includes a touch-screen display and computer memory storing at least one welding software application providing a virtual welding process. The tablet-based computing device further includes processing means operable to execute coded instructions of the at least one welding software application to generate an interactive virtual welding environment and to display the interactive virtual welding environment on the touch-screen display. The tablet-based computing device also includes an input means configured to interact with the touch-screen display when manipulated by a user to direct at least a spatial orientation of a virtual welding tool in the virtual welding environment while performing a virtual welding activity corresponding to the virtual welding process. The virtual welding process may include one of flux cored arc welding (FCAW), gas metal arc welding (GMAW), gas tungsten arc welding (GTAW), and shielded metal arc welding (SMAW). The input means may include a stylus that does not have a motion sensor or a position sensor. The input means may be configured to interact with the touch-screen display when manipulated by a user to direct at least a spatial position of a virtual welding tool in the virtual welding environment while performing a virtual welding activity corresponding to the virtual welding process. In accordance with an alternative embodiment, instead of having a separate input means, the touch-screen display is configured to be manipulated by a finger of a user to direct at least a spatial orientation of a virtual welding tool in the virtual welding environment while performing a virtual welding activity corresponding to the virtual welding process. Furthermore, the touch-screen display may be configured to be manipulated by a finger of a user to direct at least a spatial position of a virtual welding tool in the virtual welding environment while performing a virtual welding activity corresponding to the virtual welding process. The virtual welding environment may include a virtual asset to be welded using the virtual reality welding process. The virtual asset may be, for example, an automobile, a bridge, a wind turbine tower, or a building.

Figure 8:
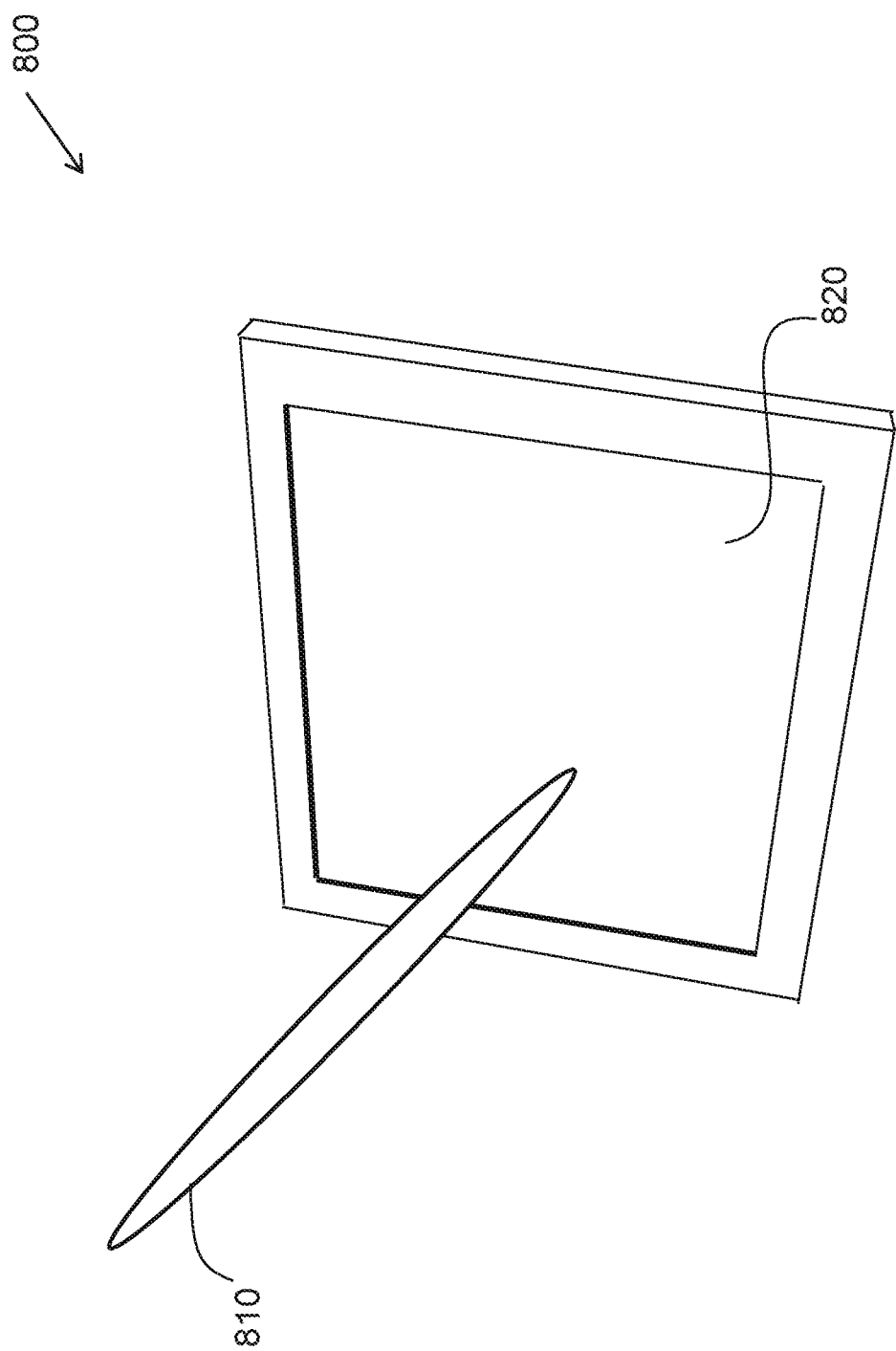
FIG. 8 illustrates an example embodiment of a tablet-based computing device (or tablet) having a stylus.
Figure 9:
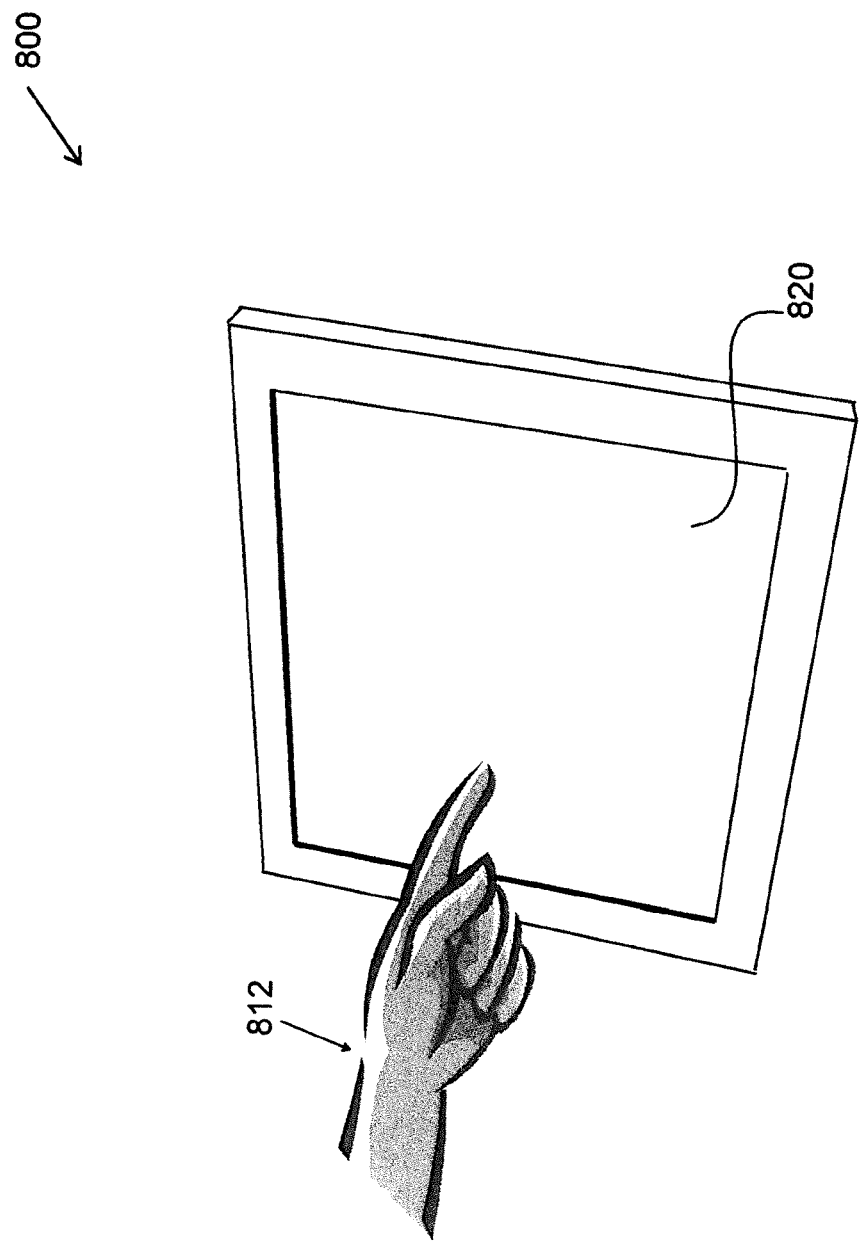
FIG. 9 illustrates an example embodiment of the tablet-based computing device of FIG. 8 (or tablet) without the stylus.

FIG. 8 illustrates an example embodiment of a tablet-based computing device 800 (or tablet) having a stylus 810. The tablet 800 also includes a touch-screen display 820. The stylus 810 may be manipulated by a user to interact with the touch-screen display 820. For example, the stylus 810 may be manipulated by a user to direct a position and spatial orientation (e.g., angle) of a virtual welding tool, in accordance with an embodiment, as discussed later herein. FIG. 9 illustrates an example embodiment of the tablet-based computing device 800 (or tablet) without the stylus 810. Instead, a user may use a finger 812 to interact with the touch-screen display 820.

Figure 10:
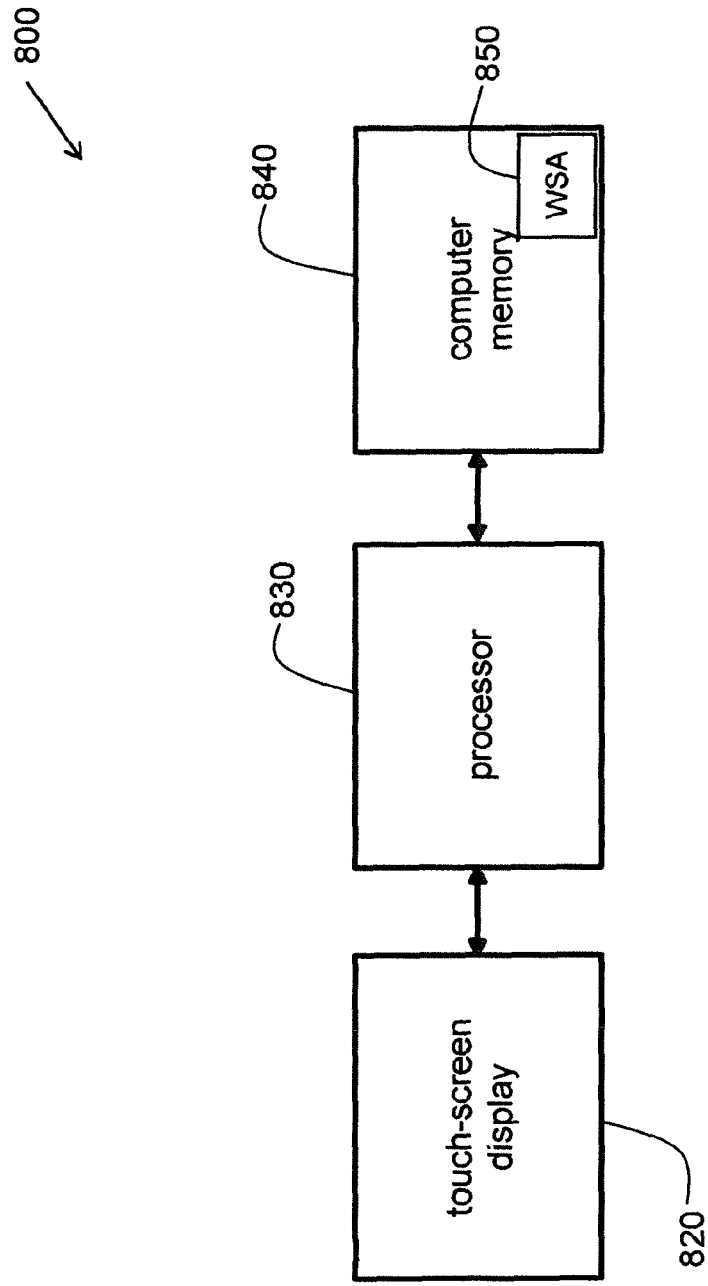
FIG. 10 illustrates a schematic block diagram of an example embodiment of the tablet of FIGS. 8 and 9.

FIG. 10 illustrates a schematic block diagram of an example embodiment of the tablet 800. As described previously herein, the tablet 800 includes a touch-screen display 820 and, optionally, a stylus 810. The tablet 800 also includes a processor 830 and computer memory 840. The processor 830 may be a programmable microprocessor, for example, although other types of logic processors are possible as well. The computer memory 840 may be, for example, electronic memory, such as a combination of random access memory (RAM) and read-only memory (ROM). Other types of computer memory may be possible as well, in accordance with various other embodiments.

The touch-screen display 820 and the computer memory 840 are operatively connected to the processor 830. In accordance with an embodiment, the computer memory 840 stores a welding software application (WSA) 850 that provides a virtual welding process (e.g., a flux cored arc welding (FCAW) process, a gas metal arc welding (GMAW) process, a gas tungsten arc welding (GTAW) process, or a shielded metal arc welding (SMAW) process. The WSA 850 provides coded instructions that may be executed on the processor 830.

In accordance with an embodiment, the WSA 850 provides coded instructions to generate and display an interactive virtual welding environment on the tablet 800. The virtual welding environment may include a virtual welding tool and a virtual part to be welded, along with various other virtual entities such as, for example, controls, indicators, and assets. The type of virtual welding tool, virtual part to be welded, and various other virtual entities in the virtual welding environment may be dependent upon the virtual welding process. For example, if the WSA 850 corresponds to a SMAW process, then the virtual welding tool will be a stick welding tool.

The virtual controls may allow the user to change a set up of the virtual welding process (e.g., amperage, voltage, wire feed speed, etc.), for example. The virtual indicators may provide displayed indications to the user with respect to, for example, pitch and roll angles of the virtual welding tool. Other indicators are possible as well, as known to one skilled in the art. The virtual assets may correspond to the type of entity that is being welded (e.g., a car, a boat, an air plane, a tractor, a bridge, a wind turbine, or a building).

In accordance with an embodiment, even though a WSA corresponds to a particular welding process, the WSA may allow the selection of different assets in the virtual welding environment. Therefore, for a WSA providing a SMAW welding process, the user may be able to select to weld on a part of a car, a boat, an air plane, a tractor, a bridge, a wind turbine, or a building, for example. Other types of virtual assets are possible as well, in accordance with various other embodiments.

The user may use the stylus 810 or his finger 812 to interact with the touch-screen display 820 to perform a virtual welding activity on the tablet 800 corresponding to the virtual welding process provided by the WSA 850. For example, the user may direct the position and orientation of a virtual welding tool, displayed on the touch-screen display 820, with respect to a virtual weld joint to simulate the creation of a weld bead along the weld joint. The user is relying on the interaction of the stylus 810 (or finger 812) with the touch-screen display to manipulate the displayed virtual weld tool. Therefore, no position sensors or motion sensors are needed to sense the position or orientation of the stylus 810 or the finger 812.

The computer memory 840 may also store other WSA's corresponding to other virtual welding processes. As a result, a user may select which WSA to execute on the tablet 800, at any given time. In this manner, a user may have a full complement of virtual welding processes from which to select and practice his virtual welding techniques.

Another embodiment provides a tablet-based computing device or tablet. The tablet includes a display, wireless communication means, and computer memory storing at least one summarizing software application. The tablet also includes processing means operable to execute coded instructions of the at least one summarizing software application. The coded instructions are executed to access at least one virtual reality welding system via the wireless communication means to download user virtual welding activity information from the at least one virtual reality welding system to the tablet. The coded instructions are also executed to generate a summary of user virtual welding progress based on the user virtual welding activity information, and display the summary of user virtual welding progress on the display. The user virtual welding activity information and the summary of user virtual welding progress may correspond to a single user of the at least one virtual reality welding system, or to a plurality of users of the at least one virtual reality welding system.

Figure 11:
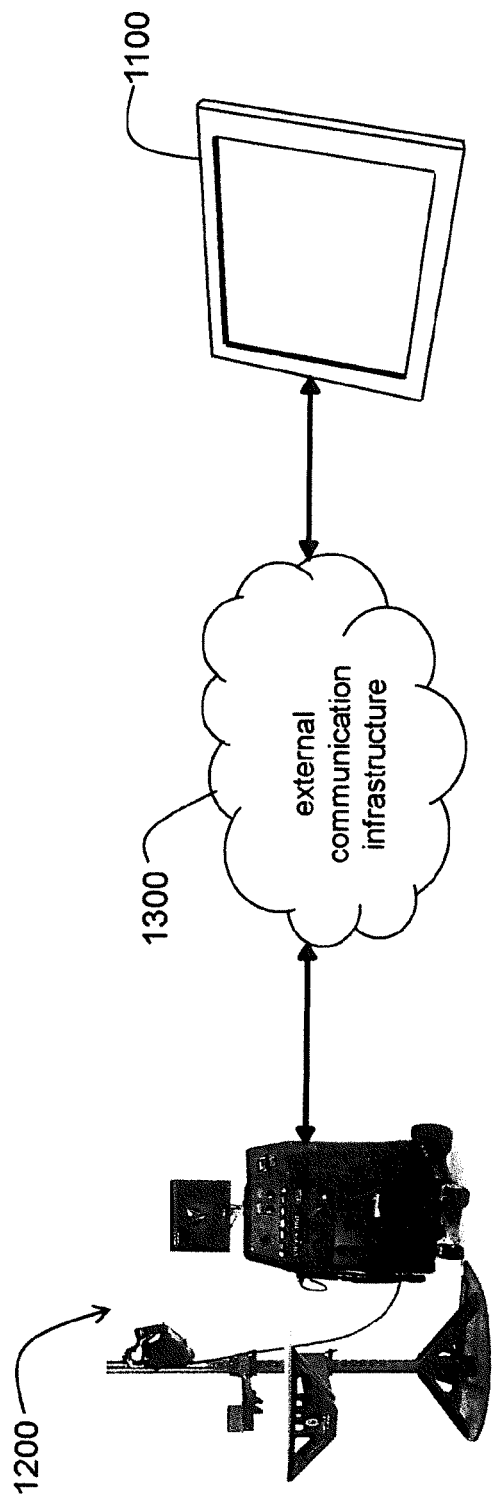
FIG. 11 illustrates an embodiment of a tablet-based computing device in communication with a virtual reality welding system via an external communication infrastructure.

FIG. 11 illustrates an embodiment of a tablet-based computing device 1100 in communication with a virtual reality welding system 1200 via an external communication infrastructure 1300. The virtual reality welding system 1200 is a simulator used to train welding students how to weld in a virtual environment. As a welding student (user) practices on the virtual reality welding system 1200, the system 1200 records user virtual welding activity information. The user virtual welding activity information may include, for example, information identifying the types of welding processes the user has performed on the virtual reality welding system 1200 along with information related to a performance of the user for each of the welding processes. The external communication infrastructure 1300 may include one or more of the internet, a cellular telephone network, or a satellite communication network, for example. Other types of external communication infrastructure may be possible as well, in accordance with various other embodiments.

Figure 12:
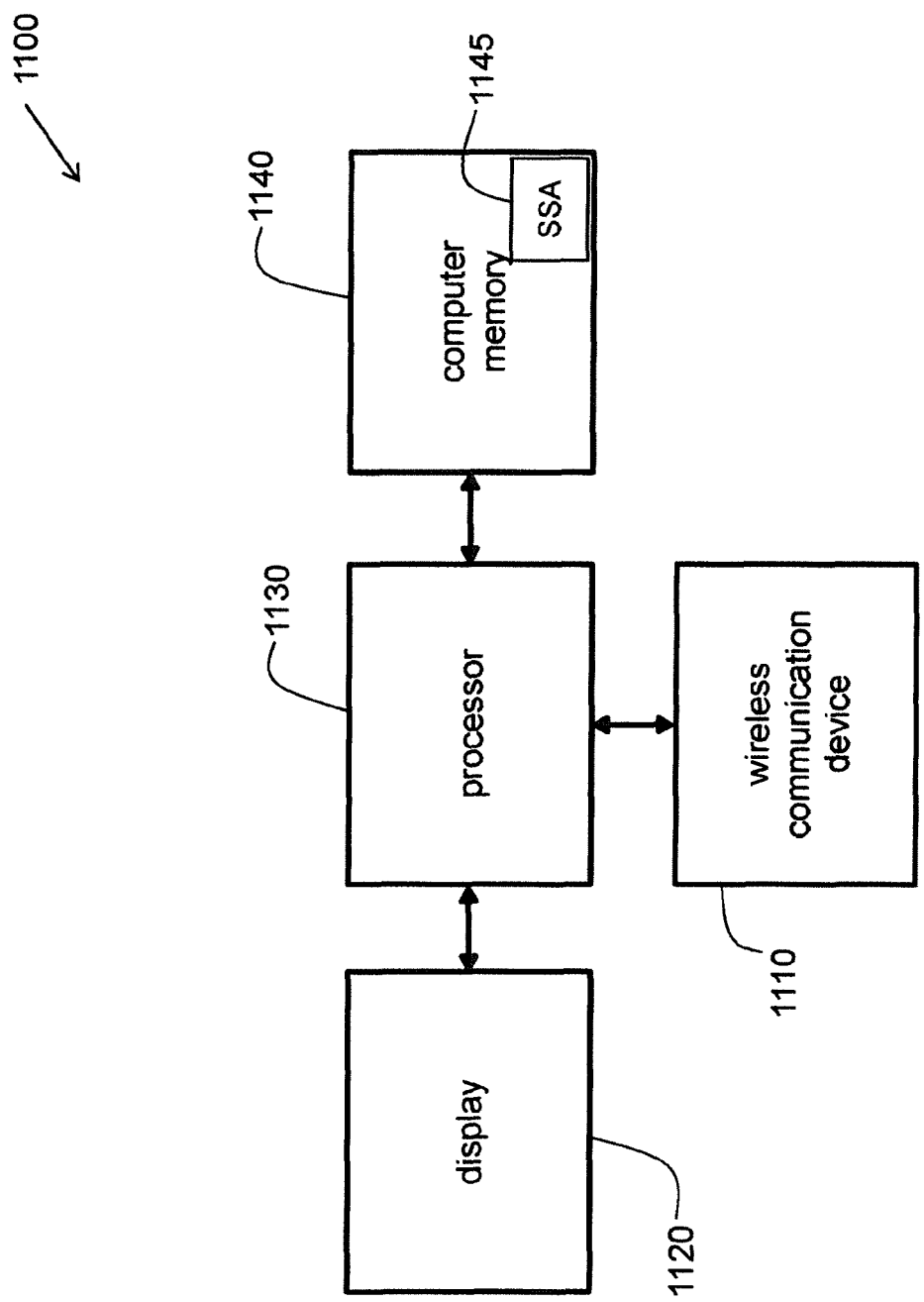
FIG. 12 illustrates a schematic block diagram of an example embodiment of the tablet of FIG. 11.

FIG. 12 illustrates a schematic block diagram of an example embodiment of the tablet 1100 of FIG. 11. The tablet 1100 includes a wireless communication device 1110. The wireless communication device may include, for example, WiFi communication circuitry and software and/or 3G or 4G communication circuitry and software providing access to the external communication infrastructure 1300. The tablet 1100 also includes a display 1120, a processor 1130, and computer memory 1140. The display 1120 may be a touch-screen display, in accordance with an embodiment. The processor 1130 may be a programmable microprocessor, for example, although other types of logic processors are possible as well. The computer memory 1140 may be, for example, electronic memory, such as a combination of random access memory (RAM) and read-only memory (ROM). Other types of computer memory may be possible as well, in accordance with various other embodiments.

The computer memory 1140 stores a summarizing software application (SSA) 1145 that provides an information summarizing capability. In accordance with an embodiment, the SSA 1145 provides coded instructions that may be executed on the processor 1130 to access the virtual reality welding system 1200 over the external communication infrastructure 1300 via the wireless communication device 1110 to retrieve user virtual welding activity information stored on the virtual reality welding system 1200. The user virtual welding activity information may be stored on the virtual reality welding system 1200 in the form of one or more electronic files, for example.

Furthermore, the SSA 1145 provides coded instructions that may be executed on the processor 1130 to generate a summary of user virtual welding progress based on the user virtual welding activity information, and display the summary on the display 1120. The summary may be displayed on the tablet 1100 in a report format, for example. Other formats are possible as well, in accordance with various other embodiments.

Again, the user virtual welding activity information may include, for example, information identifying the types of welding processes the user has performed on the virtual reality welding system 1200 along with information related to a performance of the user for each of the welding processes. The summary of user virtual welding progress generated by the tablet 1100 may include, for example, average performance information, or consolidated performance information for a user of the virtual reality welding system 1200. For example, an average pitch angle of how the user held a mock welding tool of the virtual reality welding system 1200 during a particular virtual welding process may be generated by the SSA 1145 and displayed as part of the summary. Furthermore, a consolidated presentation of pitch angle vs. roll angle of how a user held the mock welding tool during a particular virtual welding process may be generated by the SSA 1145 and displayed as part of the summary.

The summary of user virtual welding progress may also include graphical information showing how a performance parameter associated with a user has changed (e.g., improved) over time. For example, a graph of the average travel speed of a mock welding tool over a plurality of successive welding activities performed by a user for a particular welding process may be generated by the SSA 1145 and displayed as part of the summary. The graph may indicate how the average travel speed started out varying between too fast and too slow and then eventually settled to a desired travel speed during the course of, for example, twenty (20) successive welding activities for a particular welding process, thus providing an indication of how long it took for the user to settle into applying the correct travel speed to the mock welding tool of the virtual reality welding system 1200.

User virtual welding activity information may be accessed for a single user, or for a plurality of users, from one or more virtual reality welding systems, in accordance with an embodiment. For example, a welding instructor, using the tablet 1100, may access user virtual welding activity information for all of his welding students across a plurality of virtual reality welding systems 1200. The SSA 1145 on the tablet 1100 may create a summary for each welding student and may also create a consolidated summary which shows progress for all of the welding students, for example, in a comparative manner (e.g., a ranking of the welding students).

A further embodiment provides a method of virtual welding. The method includes generating a dynamic virtual welding environment within a computer-based platform and displaying stereoscopic three-dimensional (3D) images of at least a portion of the dynamic virtual welding environment on a display screen of the computer-based platform. The computer-based platform may be one of a desktop personal computer, a tablet-based computer device, a laptop computer, a notebook computer, or a workstation, for example. The method further includes viewing the stereoscopic three-dimensional images using 3D glasses, resulting in at least a portion of the dynamic virtual welding environment appearing to project out of the display screen into 3D space. The method also includes virtually welding a virtual weldment of the projected portion of the dynamic virtual welding environment in 3D space using a mock welding tool while viewing the stereoscopic three-dimensional images using 3D glasses. In accordance with an embodiment, a position and an orientation of the mock welding tool is tracked in 3D space in real time using one or more of inertial tracking techniques or magnetic tracking techniques, for example. The method also includes calibrating the mock welding tool to the projected virtual welding environment in 3D space by, for example, correlating a position of at least one point on the mock welding tool in 3D space to a position of at least one point on the projected virtual weldment in 3D space.

Figure 13:
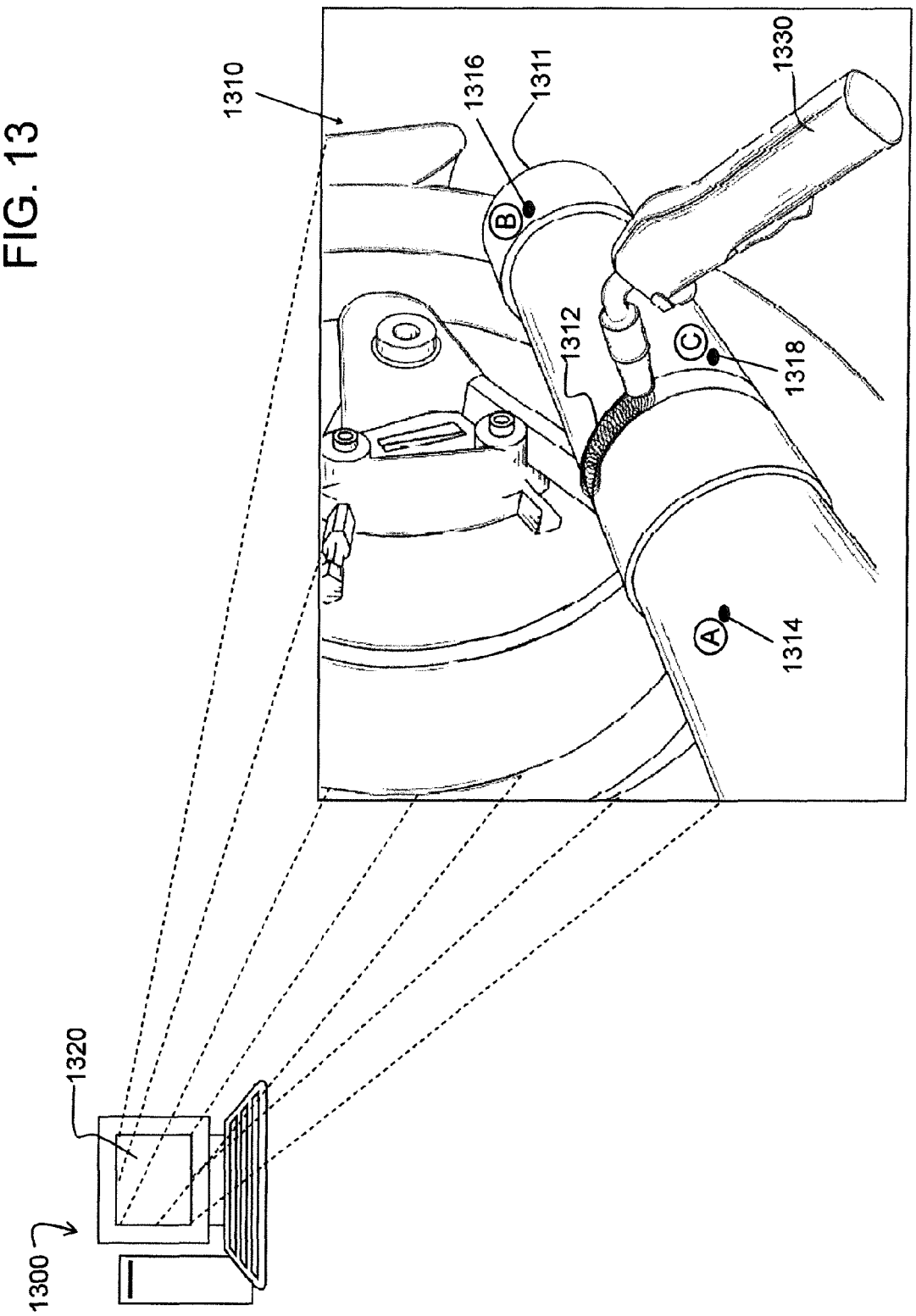
FIG. 13 illustrates a portion of a dynamic virtual welding environment, generated by a computer-based platform, that is stereoscopically projected out of a display screen of the computer-based platform into 3D space as viewed by a user wearing 3D glasses, in accordance with an embodiment.

FIG. 13 illustrates a portion of a dynamic virtual welding environment 1310, generated by a computer-based platform 1300, that is stereoscopically projected out of a display screen 1320 of the computer-based platform 1300 into 3D space as viewed by a user wearing 3D glasses, in accordance with an embodiment. The computer-based platform 1300 is configured to simulate welding activity in the virtual welding environment 1310 in real time, as affected by a user. The user may employ a mock welding tool 1330 (e.g., a plastic tool simulating a real-world welding tool) to interact with the projected portion of the dynamic virtual welding environment 1310 to virtually weld a virtual weldment (e.g., a virtual pipe 1311) to create a virtual welded joint 1312 appearing to the user in 3D space. The resultant virtual welded joint 1312 includes a virtual weld bead as created during the virtual welding activity.

The virtual welding environment is dynamic in the sense that it may be acted upon and modified in response to the user performing a virtual welding activity in real time. As the user moves the mock welding tool along the joint to create the virtual welded joint 1312 appearing to the user in 3D space, the computer-based platform 1300 updates the dynamic virtual welding environment 1310 in real time and continues to display stereoscopic 3D images of the environment on the display screen 1320 such that the user may observe his actions and the resultant creation of the virtual welded joint 1312 in real time in 3D space using 3D glasses.

In accordance with an embodiment, the appearance of the resultant virtual welded joint 1312 is realistically simulated as being dependent on the user's technique of manipulating the mock welding tool 1330, as would be the case in the real-world during a real welding activity. For example, if the user moves the tip of the mock welding tool 1330 away from the joint 1312, the displayed deposited weld bead will appear as being deposited away from the joint 1312. Furthermore, if the user moves the tip of the mock welding tool 1330 too quickly along the joint 1312, the resultant displayed deposited weld bead may have a distorted stacked-dime appearance.

For the mock welding tool 1330 to effectively interact with the virtual welding environment, as viewed as projected into 3D space by the user, the mock welding tool is tracked in 3D space and is correlated to the projected virtual welding environment in 3D space by the computer-based platform 1300. The mock welding tool may be tracked by the computer-based platform 1300 in 3D space by employing, for example, inertial tracking techniques or magnetic tracking techniques. An inertial tracking technique may employ accelerometers on the mock welding tool which report position and motion information back to the computer-based platform 1300 via wired means (e.g., a universal serial bus connection) or wireless means (e.g., a Bluetooth™ connection). A magnetic tracking technique may employ coil sensors on the mock welding tool and a magnetic source providing a magnetic field to be detected by the coil sensors. In a similar manner, the coil sensors may report position and motion information back to the computer-based platform 1300 via wired or wireless means.

To correlate or calibrate the position of the mock welding tool 1330 to the "projected position" of the virtual welding environment 1310 in 3D space, the computer-based platform 1300 may direct the user to successively place the tip of the mock welding tool 1330 at two or more points on an element of the projected environment. For example, the computer-based platform 1300 may direct the user to place the tip of the mock welding tool at pre-determined points "A" 1314, "B" 1316, and "C" 1318 on the virtual weldment 1311 in succession (see FIG. 13) as the user views the projection of the virtual weldment 1311 in 3D space. Upon recording the positions of the tip of the mock welding tool at points "A" 1314, "B" 1316, and "C" 1318 and performing a correlation calculation, the computer-based platform 1300 "knows" where the tip of the mock welding tool is with respect to the user's perception of the projected virtual welding environment in 3D space as the user performs the virtual welding activity.

FIG. 14 is a flowchart of an example embodiment of a method 1400 of virtual welding. In step 1410, generate a dynamic virtual welding environment within a computer-based platform. In step 1420, display stereoscopic 3D images of at least a portion of the dynamic virtual welding environment on a display screen of the computer-based platform. In step 1430, view the stereoscopic 3D images using 3D glasses, resulting in at least a portion of the dynamic virtual welding environment appearing to project out of the display screen into 3D space. In step 1440, virtually weld a virtual weldment of the projected portion of the dynamic virtual welding environment in 3D space using a mock welding tool while viewing the stereoscopic 3D images using 3D glasses. Again, the computer-based platform may be one of a desktop personal computer, a tablet-based computer device, a laptop computer, a notebook computer, or a workstation, for example. In accordance with an embodiment, the computer-based platform tracks the position and motion of the mock welding tool during the virtual welding activity, where the mock welding tool and the projected virtual welding environment have been correlated in 3D space.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A method comprising:
    generating a dynamic virtual welding environment within a computer-based platform which includes 3D glasses and a mock welding tool;
    displaying stereoscopic three-dimensional (3D) images of at least a portion of the dynamic virtual welding environment on a display screen of the computer-based platform;
    viewing the stereoscopic three-dimensional images using 3D glasses, resulting in at least a portion of the dynamic virtual welding environment appearing to project out of the display screen into a 3D space;
    calibrating the mock welding tool to a projected position of the projected portion of the dynamic virtual welding environment in 3D space, wherein the calibrating includes correlating a detected position of at least one point on the mock welding tool in 3D space to a known position of at least one point on a projected virtual weldment in the projected portion of the dynamic virtual welding environment in 3D space; and
    virtually welding the virtual weldment of the projected portion of the dynamic virtual welding environment projected in 3D space using the mock welding tool while viewing the stereoscopic three-dimensional images using 3D glasses, wherein virtually welding comprises tracking the mock welding tool is in 3D space and correlating a position of the mock welding tool in 3D space to a corresponding position within the projected portion of the dynamic virtual welding environment in 3D space based at least in part on a position of the projected portion of the dynamic virtual welding environment projected into the in 3D space as viewed via the 3D glasses.

2. The method of claim 1, further comprising tracking a position and an orientation of the mock welding tool in 3D space.

3. The method of claim 2, wherein the tracking is accomplished using one or more of inertial tracking techniques and magnetic tracking techniques.

4. The method of claim 1, wherein the computer-based platform includes one of a desktop personal computer, a tablet-based computer device, a laptop computer, a notebook computer, and a workstation.

* * * * *